United States Patent [19]
Brenn

[11] Patent Number: 6,133,555
[45] Date of Patent: Oct. 17, 2000

[54] ZERO DEFECT MANAGEMENT SYSTEM FOR RESTAURANT EQUIPMENT AND ENVIRONMENT EQUIPMENT

[76] Inventor: Eric Walter Brenn, 40 Raven La., Aliso Viejo, Calif. 92656

[21] Appl. No.: 09/246,480

[22] Filed: Feb. 9, 1999

[51] Int. Cl.[7] ....................................................... H05B 1/02
[52] U.S. Cl. .......................... 219/497; 219/483; 219/485; 219/494; 307/39; 99/339; 99/325
[58] Field of Search ..................................... 219/483–486, 219/497, 505, 506, 501, 494; 307/38–41; 99/325–339

[56] References Cited

U.S. PATENT DOCUMENTS

| | | | |
|---|---|---|---|
| 4,090,062 | 5/1978 | Phillips et al. | 219/486 |
| 4,419,666 | 12/1983 | Gurr et al. | 340/825.06 |
| 5,023,430 | 6/1991 | Brekkestran et al. | 219/486 |

*Primary Examiner*—Mark Paschall
*Attorney, Agent, or Firm*—Curtis L. Harrington

[57] ABSTRACT

A control system includes a variety of structures including a steam table having a reservoir with heating elements, a water level temperature probe, a safety lower temperature probe, upper overflow probes for use in filling, lower safety probes, and normal water level probes; a thermal cabinet, ice machine and other thermal devices. The controller utilizes at least one of relay shaking, probe movement checking, probe feedback checking, disappearing equipment, water working system, air flow factoring, best verifiable logic, pulse cooling, AC energy sensor analysis, cooling potential sensor analysis and pulse heating to keep the heating elements at a more even temperature during the heating process and reduce extreme thermal cycling. In addition, the system can locate intermittent problems and display the problems to workers or management, or to a central controller to initiate action in advance to repair the problem before it causes a breakdown in the equipment.

30 Claims, 23 Drawing Sheets

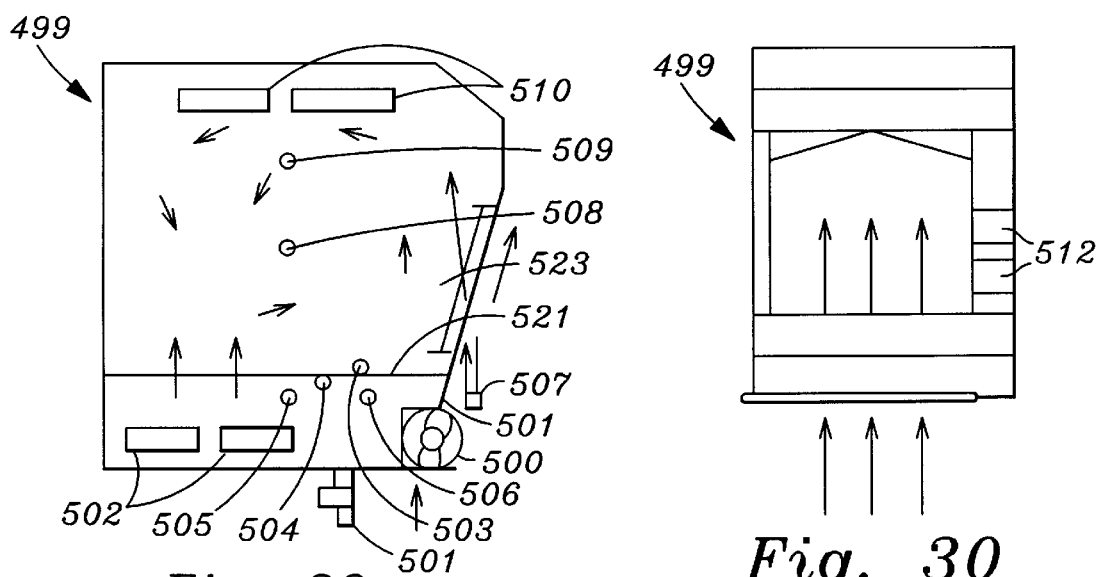
Fig. 29
Fig. 30
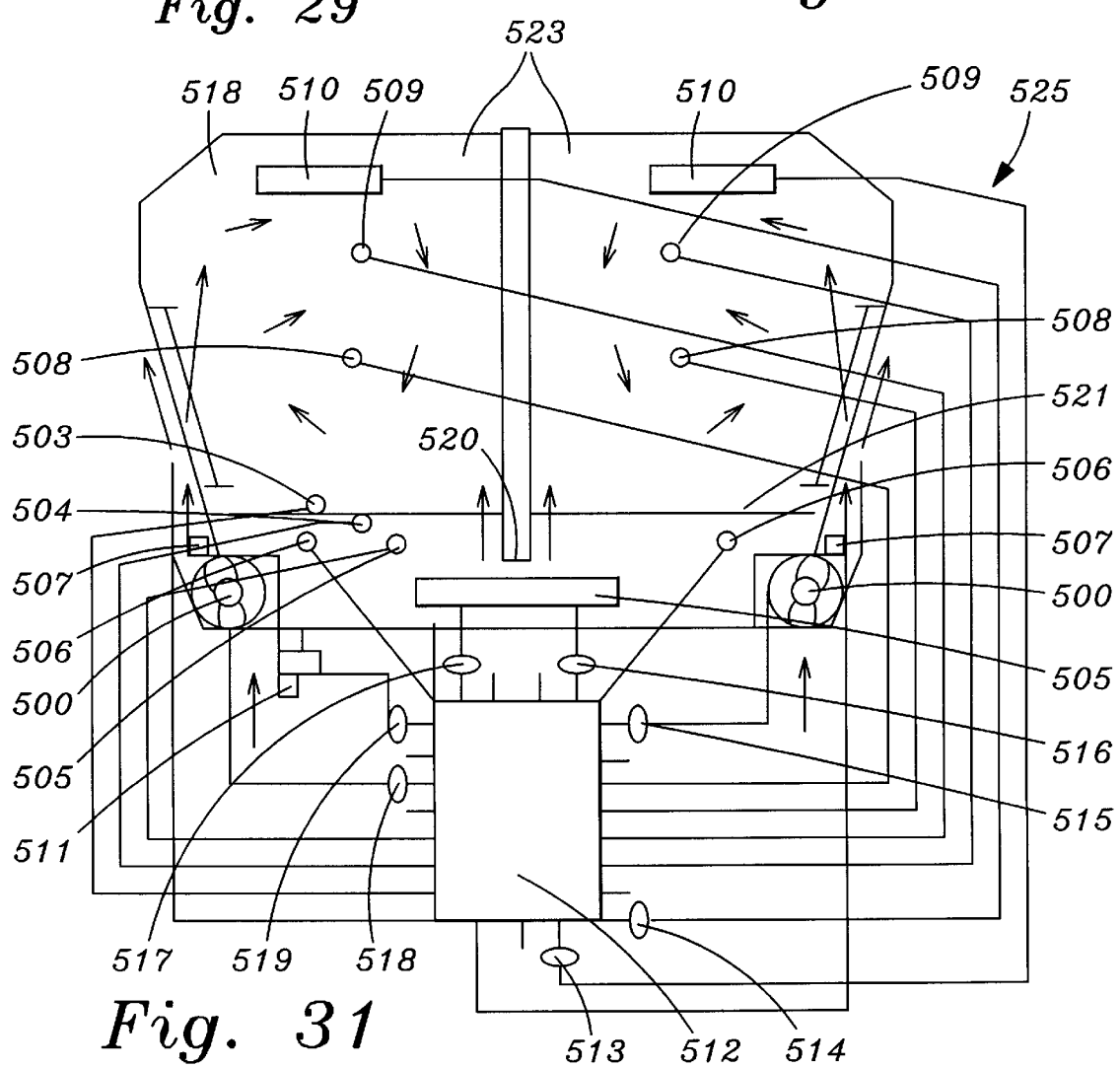
Fig. 31

ZERO DEFECT MANAGEMENT SYSTEM FOR RESTAURANT EQUIPMENT AND ENVIRONMENT EQUIPMENT

FIELD OF THE INVENTION

This application relates to novel and improved ways to operate equipment, control equipment, and novel design of restaurant equipment and environmental control for providing a more efficient, safer, serviceable, and intelligent operation through a novel feedback system, and particularly to equipment which may use a hot solution, hot gas, heating, humidity, cold solution, cold gas, refrigeration, freezing used in food or product service industry where food or other product needs to be kept at proper temperatures using mechanisms and controls to transfer or remove energy.

BACKGROUND OF THE INVENTION

As restaurants and other industries expand into national and global markets, they have increased problems with their equipment running properly. Regardless of whether the failures relate to communication, education, installation, manufacturing, design, or service issues, the growing companies experiencing these failures have become increasingly vulnerable to food or product safety problems. The current technology available simply cannot handle their needs. Typically a facility will require on-site diagnosis, evaluation, and feedback which costs increasing amounts in order to do business. A company with thousands of individual locations has no realistic way of implementing a Zero Defect Program with existing technologies, absent a complete re-engineering of and homogenization of each individual facility. The term "Zero Defect" for such a company having multiple locations means that during no appreciable time period its thousands of locations will not have a piece of equipment down or out of specification. When a malfunction occurs, the "Zero Defect" system insures that the equipment will be back in service within a specified time and incur a known amount of cost. A system which currently gives these benefits is not available, but is acutely needed in the growing restaurant industry.

This aspect of being able to handle Zero Defects gives control to the quality assurance function. If a particular location cannot serve any products or cannot serve a product from a particular piece of equipment, quality assurance suffers. As companies expand, they lose more control over their equipment and departmental cohesion. In the company organization, failures in equipment can be debilitating and costly. Without some effective and low cost way to manage these pieces of equipment, the equipment owners are subject to excess losses, potential danger to the public, and creation of an internal debilitating atmosphere of indecision and meaningless blame assessment.

Serving food products from defective equipment can have far reaching, sometimes deadly consequences. Not only can such an instance cause corporations in product costs and legal expenses, but they can damage their customer base with a single food problem.

To solve some of these problems, companies have put in alarm systems that call quality assurance for problems with a single scalar quantity, such as temperature. A thousand locations with thousands of pieces of equipment that are unknowingly on the brink of failure can result in a major disaster. With all these pieces of equipment in questionable health, you have to dispatch repair personnel to each location to have them determine if the problem is one of service, installation, manufacturing, design, maintenance, or equipment abuse. Because of the wide disparity in technical competence of the repair personnel, the diagnosis and absolutely necessity of repairs becomes a further issue.

With existing technology, companies do not have the foreknowledge that something has broken in their equipment that will cause it to operate out of acceptable specification within an estimated amount of time. This foreknowledge if it could be had and at a reasonable cost, could give management time to have emergency repairs or formulate a backup plan and also gives quality assurance knowledge of the incident and the opportunity to get involved. With existing technology you will notice problems after the fact. Existing technology does not have a way to tell what has gone wrong and then what to bring to fix it and how long it will take from thousands of locations across the globe. With existing technology you have to send a mechanic on location and hope he will find the problem and not charge too much to fix it, as well as to rely upon his competence and honesty. Without the diagnostic information the company owning the equipment does not know when to schedule the repair, because many times repairs need to be done during off hours. In many instances, service has to show up many different times at a site and this costs the company. The Zero Defect Management for restaurant and other equipment for global access gives companies a way to manage these and other issues efficiently and cost effectively.

SUMMARY OF THE INVENTION

This invention includes a number of novel ways to manage equipment globally. This implementation cost is higher than simply to rely upon existing technology, but can conservatively save seven or more times the amount of the initial investment during the first few years. The system of the invention reduces service costs, downtime costs, energy costs, monitoring costs, product safety costs, product costs, analysis costs, and checkup costs. The topology of the invention can be best understood as having three identifiable general areas. First, sensors and methods for their control includes a use of low cost sensors and methods for running equipment. Second, equipment designs that are integrated with the established sensors. Third, an integration of sensors and equipment design is expanded to the global level from individual equipment sites. Through the feedback from this globally integrated system, a control unit, such as an integrated company, can rapidly assess a problem, determine if the problem comes from service, installation, manufacturing, design, maintenance, or equipment abuse issues. The command and control entity will be able to identify what needs improvement and what does not, and this is done in-house, but without the necessity of keeping a large diagnostic staff. In-house capability also indicates no costly outside monitoring fees.

Over the long run, by using Zero Defect Management techniques and systems of the invention, the existing equipment cost will rise initially and then become lower. For example, if an existing unit of equipment costs $50 and costs $5 a day to run, implementation of a Zero Defect equivalent unit of equipment, by either new purchase or retrofit, would have an initial cost $500 and only $1 a day to run. Over 10 years the operating cost of the old equipment would be greater than the Zero Defect Equipment many times over. This novel concept wishes to show how Zero Defect Management can save money, time, and lives.

BRIEF DESCRIPTION OF THE DRAWINGS

The invention, its configuration, construction, and operation will be best further described in the following detailed description, taken in conjunction with the accompanying drawings in which:

FIG. 29 is a side view of a design for a single door less steam cabinet;

FIG. 30 is a front view of a design for the single door less steam cabinet seen in FIG. 29.

FIG. 31 is a side view of a design for a double door less steam cabinet similar to those seen in FIGS. 29 & 30;

DETAILED DESCRIPTION OF THE PREFERRED EMBODIMENT

Figure 1:
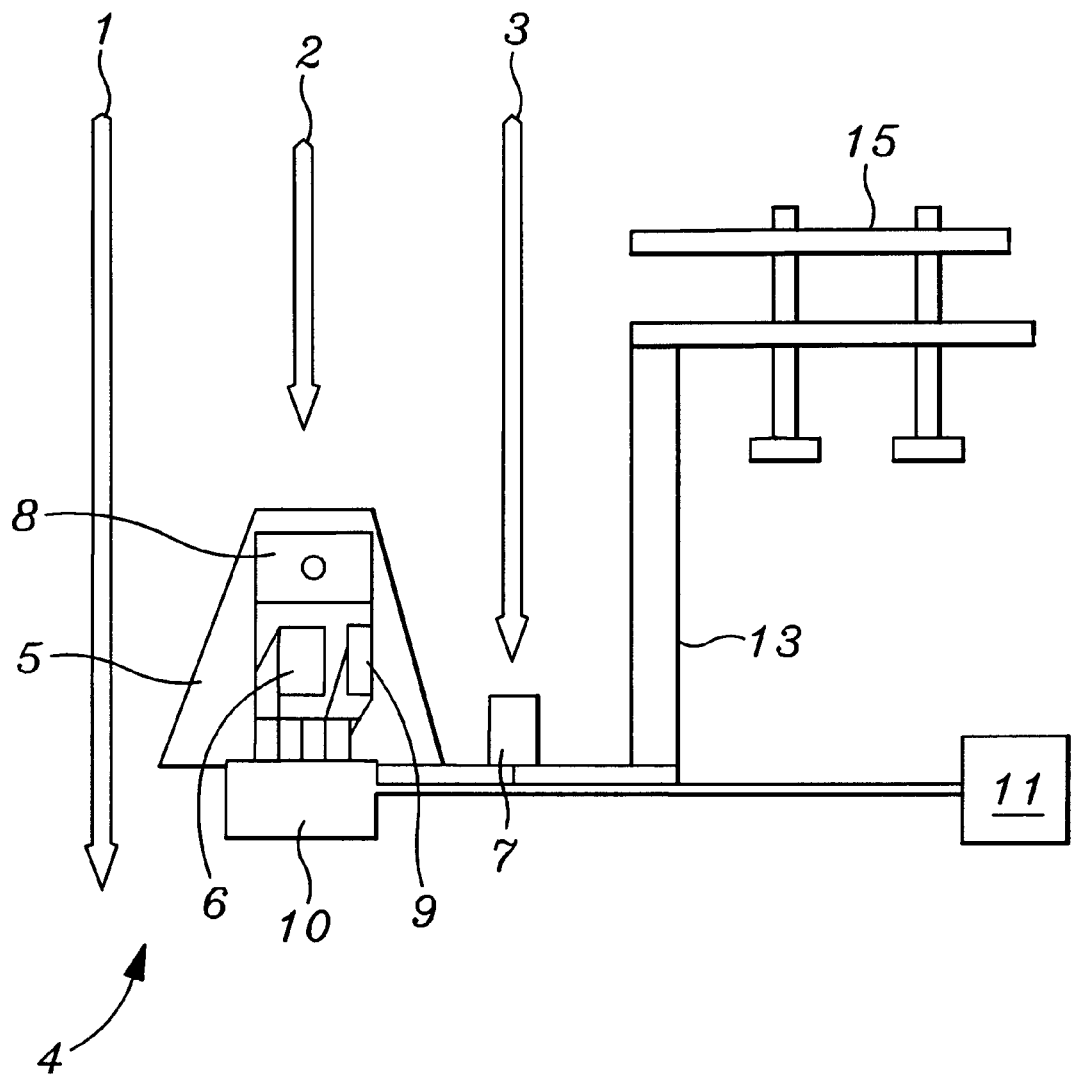
FIG. 1 is a schematic illustration of a cooling potential sensor and its typical environment.

The description and operation of the invention will be best described with reference to sensor designs and methods of control operation. Referring to FIG. 1, arrows 1,2,3 show an air flow path across the cooling potential sensor 4. The cooling potential sensor 4 is housed in an aluminum or other heat conductive material housing 5 that holds the component parts of the cooling potential sensor 4 as well as to give it a large surface area for thermal transmission cooling. A temperature probe 6 within the housing 5 is used to measure the temperature inside the cooling potential sensor 4, and a temperature probe 7 is used to measure the temperature outside the cooling potential sensor 4, so that a temperature potential difference can be computed. A voltage regulator 8 or a load resistor 9 or other heat producing device can be used to heat up the sensor 4 at a specified rate. A connector 10 connects the sensor to a control 11 that reads the temperatures of probes 6 and 7 and which has the capability to turn on the power at the specified rate to the heating devices voltage regulator 8 or load resistor 9. A bracket 13 holds the cooling potential sensor 4 at a desired location in the air stream 1, 2, 3. The control 11 activates the sensor heating devices voltage regulator 8 or load resistor 9 and continually reads the temperatures. After a predetermined time has gone by, the control 11 turns off the cooling potential sensor heating devices 8 or 9, and then counts how long it takes to decrease the inside cooling potential sensor 6 temperature to the outside cooling potential sensor temperature 7. The outside temperature is not always needed, and the control 11 can use the starting temperature of the temperature sensor 6 as a reference.

The higher amount of air flow, the faster the cooling potential sensor 4 will cool, and a resulting air flow rate can be computed. The size and orientation of the ducting and air temperature plays a role in the calculation for air flow. The cooling potential sensor 4 can, over time, detect its own need for cleaning by seeing a gradual decrease in the cooling potential sensor 4 ability to cool. When that gradual decrease approaches a predetermined limit the control 11 will indicate that the cooling potential sensor 4 needs to be cleaned. This ability to self detect the need for cleaning works well with a set of condenser coils 15 because as the cooling potential sensor gets dirty the condenser coils 15 also get dirty. Therefore, from a maintenance management standpoint, when the cooling potential sensor 4 needs cleaning, the condenser coils 15 will also need cleaning.

Figure 2:
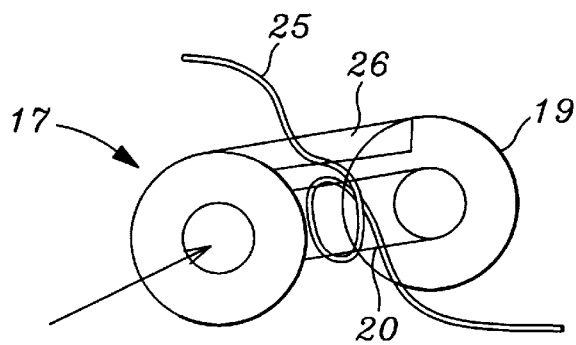
FIG. 2 is a schematic illustration of a spool structure used to form a first type of AC energy sensor

A second sensor is an alternating current or AC energy sensor 17 and is seen in FIGS. 2–6. Generally there can be four different types. Two of which are a spool type, or spool 19, having a spool core 20, as shown in FIG. 2, and which have two different inserts 21 and 22, seen in FIGS. 3 and 4. Another two sensors are circuit board types 23 and 24, and seen in FIGS. 5 and 6, respectively.

Referring to FIG. 2, non-conductive spool 19 core 20 has an AC system wire 25 wrapped around it and held in place by clasp 26. The spool 19 is novel because the AC wire 25 never needs to be cut, and the long ends of the spool 19 keep other wires away from the spool 19. Unlike conventional toroidal or doughnut shaped structures in which a wire is inserted through, the spool 19 can be placed next to other spools 19. Toroidal shaped detector structures cannot be placed next to each other due to mutual interference. However, the spool 19 will work next to other spools 19 other because the ends of spool 19 help to provide enough distance from another structure such that the electromagnetic inductance will be negligible.

Figure 3:
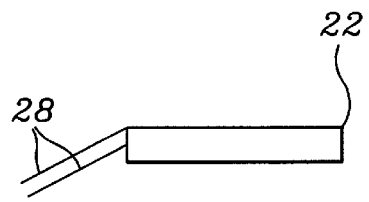
FIG. 3 is wire wrapped core type of AC energy sensor having a pair of wire leads.

There are two inside cores 21 and 22 that can go into the spool 19. Referring to FIG. 3, core 21 is a wire wrapped core that preferably has a pair of wire leads 27A which form a an elongate coil 27B which is wound at right angles to the direction of the wrap of the AC system wire 25 onto the spool 19. The coil 27B picks up the electromagnetic inductance from the AC wire 25 and generates a small signal of energy that is sent back to the control via wires 27A.

Figure 4:
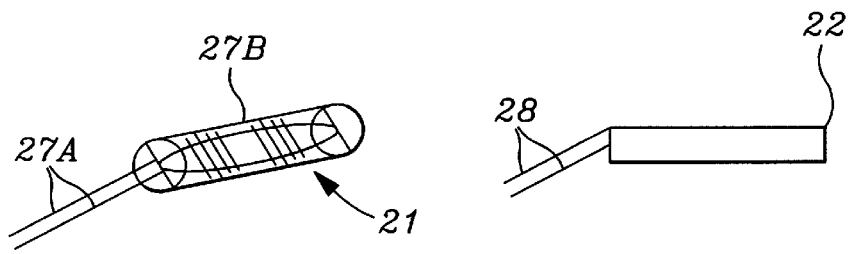
FIG. 4 illustrates a Hall-type AC energy sensor also having a pair of wire leads.

The second of the inside cores 21 and 22 is a hall effect sensor or other sensor that picks up the strength of the electromagnetic field and sends the result back through a pair of wires 28 to the control 11 of FIG. 1. Referring to FIG. 4, core 22 may be available in a variety of shapes and includes sensors such as hall effect sensors which may be well known. The use of hall effect sensors with the spool 19 is a new approach which yields advantageous results.

Figure 5:
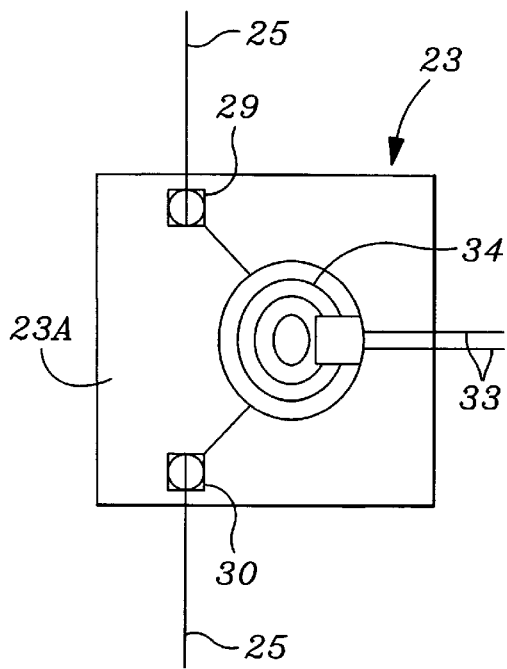
FIG. 5 is a first type of circuit board or non-conductive material mounted AC energy sensor.

The second two types of AC energy sensor 17 include circuit board types 23 and 24 which use a circuit board as a support, and gain a similar result. Referring to FIG. 5, the use of circuit board types 23 and 24 requires at least one of the AC wires 25 to be cut and attached to the circuit board via terminals 29, 30 of circuit board type 23, and terminals 31 and 32 of circuit board type 24.

Figure 6:
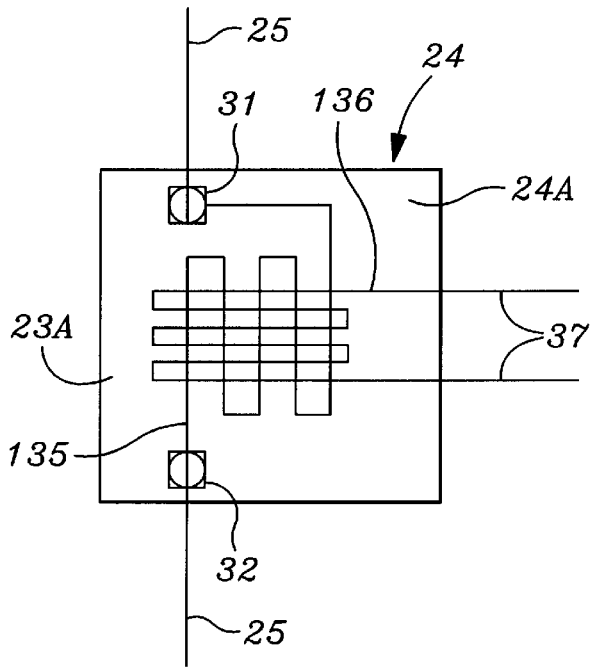
FIG. 6 is a second type of circuit board or non-conductive material mounted AC energy sensor having a rectangular serpentine pattern overlying or underlying flat wire.

Referring to FIG. 5, circuit board type 23 uses a circuit board 23A supporting a hall affect sensor or other sensor, possibly using a flat circular wire 34, to pick up electromagnetic inductance and the result is sent back via wires 33 to the control 11 of FIG. 1. Referring to FIG. 6, circuit board type 24 uses a circuit board 24A to support a flat wire 35 seen extending in a rectangular serpentine pattern between terminals 31 and 32 on the top of a buffer media or insulation layer such as plastic, and overlying or underlying flat wire 36, also seen in a serpentine right angled pattern with respect to wire 35, and extending between a pair of terminal wires 37. The traces or extensions of the AC wire 35 are perpendicular to the traces of sensor wire 36. The electromagnetic inductance is passed from the wire 35 to wire 36 through the buffer media and then out to the control through terminal wires 37. All of the AC energy sensors 17 are novel in that they do not have any parts that are movable and are smaller and can more be easily mass produced at lower cost.

Some of the methods of control and operation of the invention will include a method of heating a system referred hereinafter as pulse heating. This type of heating keeps the heated elements at a much more even temperature when heating and increases element life by not allowing heating elements to get too hot. This technique avoids the drastic ups and downs of placing an element in the off state (cold) and in the hot state (way above the set point) as well as it does not force the element to constantly stay on. By pulsing or energizing the element intermittently at intervals that may be established from temperature feedback, the temperature of the element can be held at close to the set point value with only small degrees of fluctuation, if any, once the system is optimized. This reduces the recovery time for the element to get to its target temperature and also reduces the overshoot time that the element experiences above the target temperature set point. If the elements are immersed in a solution, it will not enable the solution to boil away from the element to cause heating element damage. In a dry warming unit, air is used instead of water, and higher overshoot temperatures are more easily achieved since heat is not taken away from a heating element as rapidly in air, as is the case in water. Control is also important because of the large recovery and overshoot time periods in a dry warming unit. The same problems exist in a dry warming unit which uses gas instead of electric elements.

Figure 7:
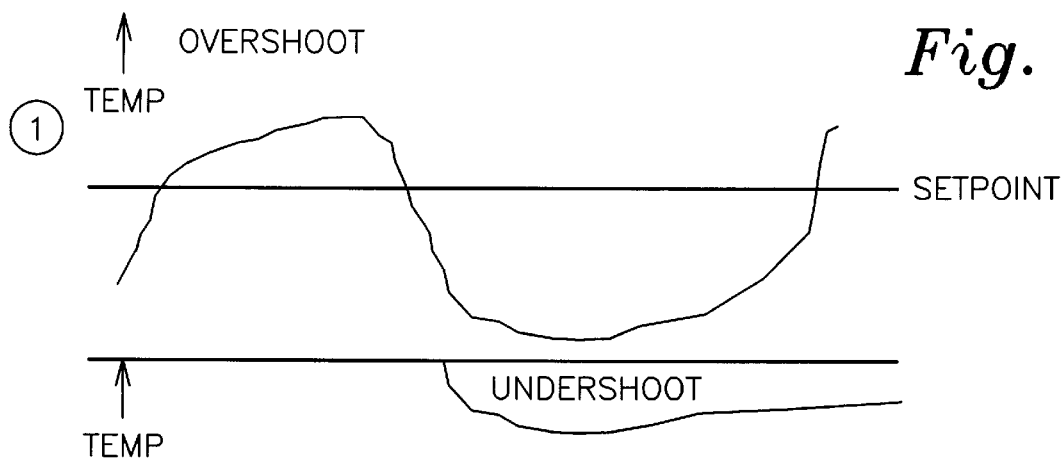
FIG. 7 is a graphical illustration of overshoot and undershoot of a set point target.

To illustrate the advantages of the invention, and referring generally to FIGS. 7–12, a series of illustrative graphs will be used to contrast analog control from pulse heating. Referring to FIG. 7, a function such as temperature is plotted on the ordinate against a function such as time on the abscissa. The darkened horizontal line represents the temperature target or set point. Heating occurs early in time, but the temperature drives past the set point into an overshoot region. The power is shut off and the temperature falls below the set point into an undershoot region until it falls below a minimum value and a heating element is energized to drive the temperature again above the set point where it begins to extend into an overshoot region. This overshoot and undershoot in a piece of equipment can cause problems for the customer and even at times make the equipment not applicable to certain applications. With the pulse heating system this overshoot and undershoot can be reduced to almost nothing or minimal.

Figure 8:
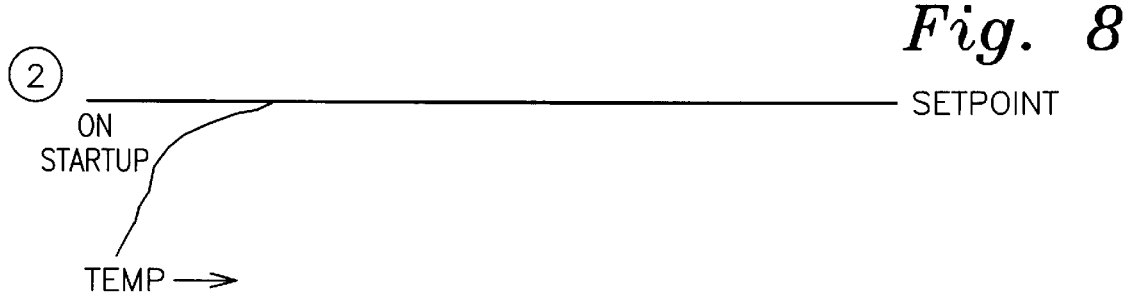
FIG. 8 is a graphical illustration of asymptotic approach of a set point target.
Figure 9:
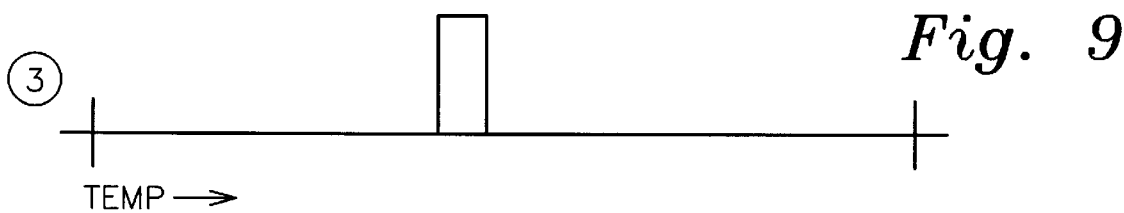
FIG. 9 is a graphical illustration of one pulse of a specified magnitude of a specified time duration, useful in pulse heating.

FIG. 8 shows how the graph of FIG. 7 can be changed with pulse heating. The pulse heating works in the following two ways or a combination of the two. The first way is to modulate the amount of heating to pulses within a certain time period. For example, when the element needs to just stay warm and cools off very slowly, the controller 11 could only activate one pulse of a specified time duration in the time period seen in FIG. 9. If controller 11 wants to keep the temperature constant through an optimization routine, and depending upon the other system requirements, such a requirement may be three pulses per time period, as shown in FIG. 10, or maybe three pulses the first time period and two pulses the next (not shown) and so on.

Figure 10:
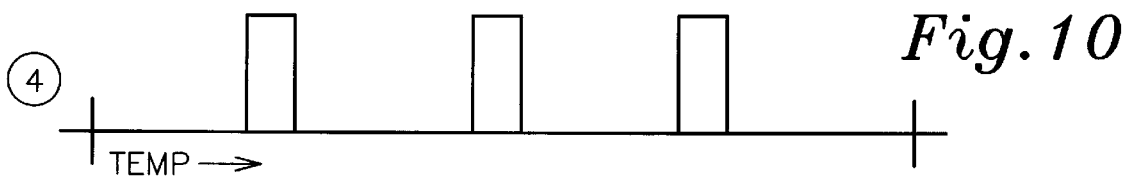
FIG. 10 is a graphical illustration of a number of pulses of specified magnitude and specified time duration, useful in pulse heating.
Figure 11:
FIG. 11 is a graphical illustration of one pulse of a specified magnitude of a relatively long pre specified time duration, useful in pulse heating and especially startup heating where a relatively large amount of startup energy is needed.

Again depending upon system configuration and constraints, if it is desired to gradually increase the temperature, pulses can be added to increase the amount of energy in the time period as seen in FIG. 10. The optimization works by adding/subtracting a pulse and measurement of the results, long term, through feedback. The system incorporating pulse heating may be pre-supplied with an approximate ratio of pulse magnitude to duration, which is modified and recorded slowly by the system until things are fully optimized. A heating system checks continually and optimizes continually as it runs to hold the temperatures as closely to the set point as possible. One possible formula which has been found to be effective is:

$$(y \text{ Degrees Temp. Increase})/(t \text{ Time Period/s}) =$$
$$(x \text{ \# of pulses})/(t \text{ Time Period/s}) *$$
$$(\text{Energy In} - \text{Cooling Factor}/(\text{Set point Temp- System Temp}))$$

A second way of performing the heating is by controlling the pulsing percentage ON vs. Percentage OFF for specified time duration. If more/less heat is required, the percentage on time increases/decreases gradually until the proper temperature can be held constant or optimization is complete. An example of a 25% on cycle would look like FIG. 11. The optimization works by adding/subtracting a specified percentage and feed backing. A system may again be supplied with an approximate ratio, which is modified and recorded slowly by the system until things are fully optimized. The system may check continually and optimize continually as it runs to hold the temperatures as closely to the set point as possible.

Figure 12:
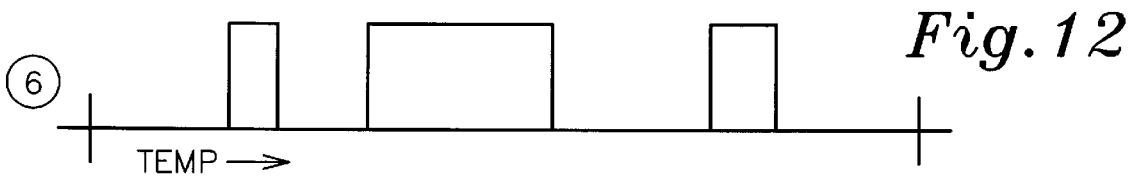
FIG. 12 is a graphical illustration of a number of pulses of specified magnitude and different pre specified time durations, useful in interactive and feedback pulse heating.

Combining the two systems could use different pulses of different percentage time duration that you optimize as shown in FIG. 12. There are two methods of increasing temperature, a) increasing a pulse width or all pulse widths or b) decreasing pulse widths and increasing pulse numbers. The magnitude of the power supplied to a heating element during the duration of the pulse will depend upon further specified aspects of the heating elements and power supply. By increasing pulse numbers, each at lesser temporal lengths, the temperature control can be optimized more exactly. This is in contrast to increasing the pulse width to increase temperature with a burst of higher temperatures, which would usually only be necessary when first starting the equipment, and only where a quick heating over a short time is desired. A system having the flexibility to accomplish all of these objectives generally requires more computations and better hardware, but it heat faster, maintain temperature more exactly, and will increase overall efficiency. Even if the system overshoots the set point, it is still pulsing and keeping the elements warm and therefore slowly brings the temperature down so there is a very minimal undershoot. The heat is pulsed all the time under or over the set points, but just at different ratios. Pulse heating can be used in systems that use on/off switches as well as systems that increase and decrease the amount of current consumed by the heater.

Pulse heating can be taken a step further mode of operation which may be referred to as "disappearing equipment". Since the pulse heating turns elements on and off, if there is a common link between equipment that can coordinate the equipment to pulse at different intervals, the peak energy demand can be reduced. For example, when system A pulse is on, system B pulse is off and vice versa. Since, the energy bill rates may be based on the highest spike {one system running at the same time as the other) utility rates can increase in situations where most of the system components come on at the same time. With the disappearing equipment method, a cost savings in billing and needed capacity can result. Even though the total kilowatt-hour utilized are the same, your billing rate is less per called-hour because the electric company only sees the maximum magnitude or spike of one piece of equipment. This method of disappearing equipment is advantageous because you can have many pieces of equipment on a rhythm of pulse heating on the individual element level.

The pulse heating can also be used as pulse cooling. The pulse cooling system works in the same pulse format, but it is used in cooling equipment instead of heating equipment. Like pulse heating, pulse cooling has a target temperature. When the temperature is above its set point, it increases its pulses and as it goes below the set points, it decreases its pulses. Other considerations may be present, for example a minimum on time in order for cooling to occur. In most cooling system an on condition begins compression of refrigerant and it begins to provide cooling to a first portion of a heat exchanger, followed by eventual cooling of the whole heat exchanger. As a result, the magnitude of an "on" time duration is not effectively reducible to zero or even below a lower limit without rendering the energization time ineffective. For example, if it takes 30 seconds to begin to flow reduced temperature refrigerant, due to the physical capacity of the system, an on time of less than 30 will certainly have no effect. The characteristics of the cooling systems, including capacity and flow rates would ideally have such characteristics taken to account in designing the overall control 11. As such, elimination of, overshoot, and under shoot may give way to equipment limitations. However, the overall goal of flattening the energy demand can still be achieved not only by mixing the energization of cooler structures with each other, but also by mixing the cooler structures with all of the other elements.

Figure 13:
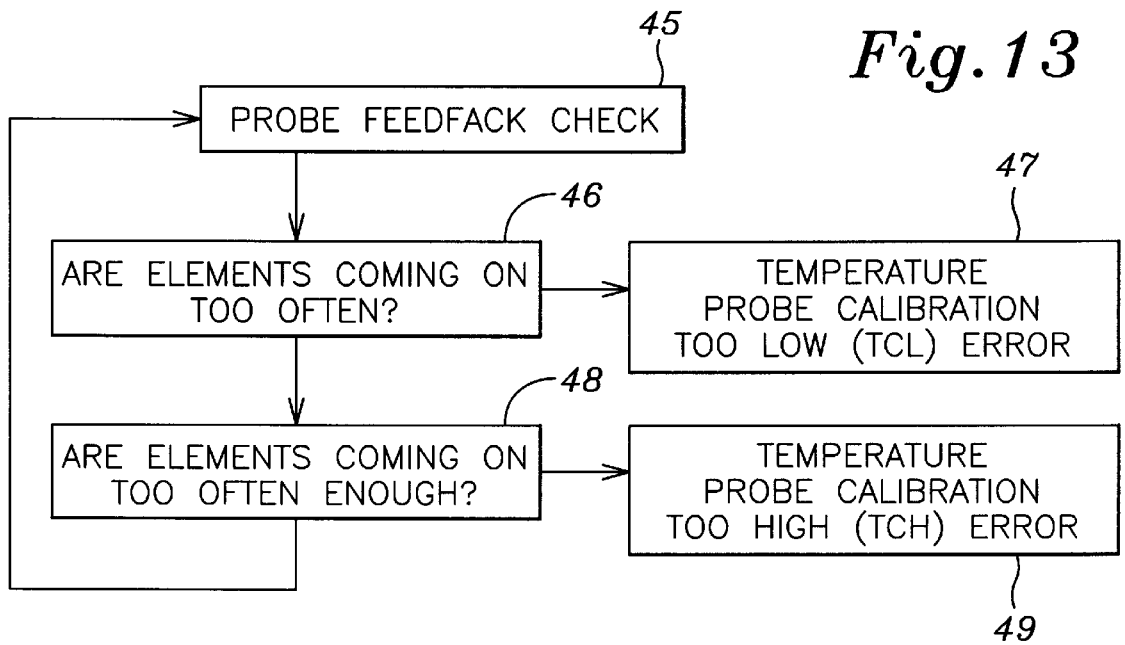
FIG. 13 is a process flow block diagram related to the feedback checking of probes.

A probe feedback check is a method displayed in a process flow diagram seen in FIG. 13 and gives a new ability to test temperature probes 6 and 7 and to test if they are within calibration limits. It is a constant problem in the control field, to know when your temperature probe is out of calibration. It is easier to tell if it is broken, but is very difficult to tell if it needs calibration. Referring to FIG. 13, a BEGIN PROBE FEEDBACK CHECK block 45 initiates the checking steps. The logic flows to a ARE ELEMENTS COMING ON TOO OFTEN block 46, which indicates a "yes" answer if the temperature elements are coming on too often or out of the bounds of normal operation. A yes result logically leads to a TEMPERATURE PROBE CALIBRATION TOO LOW (TCL) ERROR block 47, which may report back in an integrated system to any level necessary to initiate remedying the problem.

This solution will depend upon system topology. If a central system were located in a major city and also sparsely spread over a large rural area, an error in an urban location may be handled differently than the rural area. For example, in an urban area a malfunction may result in calling a local vendor. A rural area malfunction may result in calling an in-house repair unit or solution having a cost more compatible with rural areas. Any of the other error blocks following will similarly be dealt with in different ways which may be based upon best cost solution, as well as echelons where a first solution may be in use or not available. The action solutions can have their own heuristic.

Referring again to FIG. 13, if the answer to the question posed by ARE ELEMENTS COMING ON TOO OFTEN block 46 is negative, the logic flows to an ARE ELEMENTS COMING ON NOT OFTEN ENOUGH block 48, where the method checks if the elements are coming on not often enough or out of the bounds of normal operation. A "no" answer causes the logic to extend back to BEGIN PROBE FEEDBACK CHECK block 45. A "yes" answer causes the logic to extend to a TEMPERATURE PROBE CALIBRATION TOO HIGH (TCH) ERROR block 49, which may trigger a different problem solution. The method of FIG. 13 can also be reversed and used on a cold system where it must cool instead of heat, and applied to other types of probes.

Figure 14:
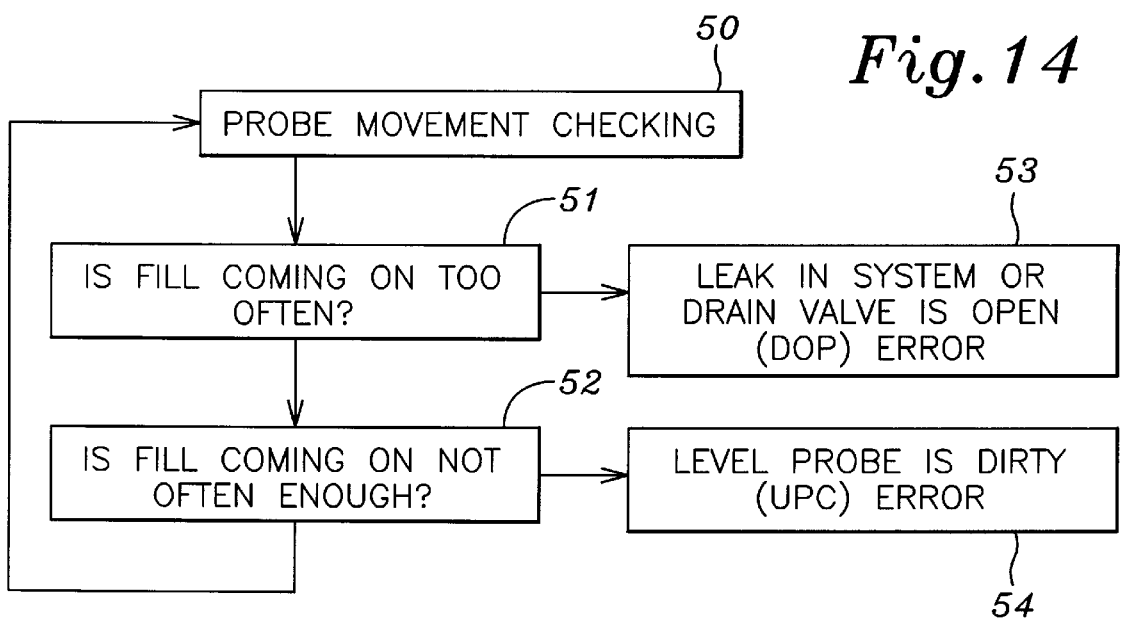
FIG. 14 is a process flow block diagram related to the movement checking of probes.

Probe movement checking is a further inventive method of operation of a solution temperature, level probes, and other probes. Referring to FIG. 14, a block diagram illustrates a test procedure to give an indication of a false reading if a liquid detection probe is not broken or are not reading within proper parameters. Liquid contact probes can be used to determine low heating or cooling water levels, as well as the presence of water where it is not wanted. Other systems are available for oil and water systems and other liquid detection. The optimum case is for liquid level probes in a water table where water is the bulk medium for providing heat transfer.

For example if liquid contact probes are indicating the system holding tank is full and the water filling mechanism does not come on, it is difficult to ascertain if the probe is giving a correct reading. This is a problem within the food service industry that is of great concern. Upper probes which give an indication of full when a system holding tank is not full can damage up heating elements, warp pans, and cause many other damages and injury. This inventive method of probe analysis begins with reference to FIG. 14 as a logic flow diagram. At the top, a PROBE MOVEMENT CHECKING block 50 is the block from which logic flow begins. Logic leads next to an IS FILL COMING ON TOO OFTEN block 51, with a "no" answer leading to an IS FILL COMING ON NOT OFTEN ENOUGH block 52. A "no" result at block 52 leads back to the PROBE MOVEMENT CHECKING block 50. A "no" result at the IS FILL COMING ON TOO OFTEN block 51 leads to a LEAK IN SYSTEM OR DRAIN VALVE IS OPEN (DOP) ERROR block 53 which might be caused by a leak or drain valve having been left open. LEAK IN SYSTEM OR DRAIN VALVE IS OPEN (DOP) ERROR block 53 creates an error signal and may be handled, as was described with regard to FIG. 13, in several ways.

A "no" result at the IS FILL COMING ON NOT OFTEN ENOUGH block 52 leads to a LEVEL PROBE IS DIRTY (UPC) ERROR block 54 which creates an error signal and may also handled in several ways, one of which might be to merely instruct the local operator to physically clean the probe. This is way of telling if the solution probe is dirty or functioning properly. Relay shaking is an inventive method that includes the ability of the unit to shake solid state relay loose from their state when they stick on or off. If one of the solid state relays gets stuck on or off, the system will attempt to unstick them by turning on and off the power to them as well as try to reset them by tuning off and on the activation pulse. At times solid state relays can stick because of voltage spikes, phase shifts, and other electrical disturbances. The system has the inventive ability to automatically react to these phenomenon and correct it, if possible, without calling for service or imposing a manual shutdown. This decreases the likelihood of having a runaway system or a system that will not be able to turn on or off.

Figure 15:
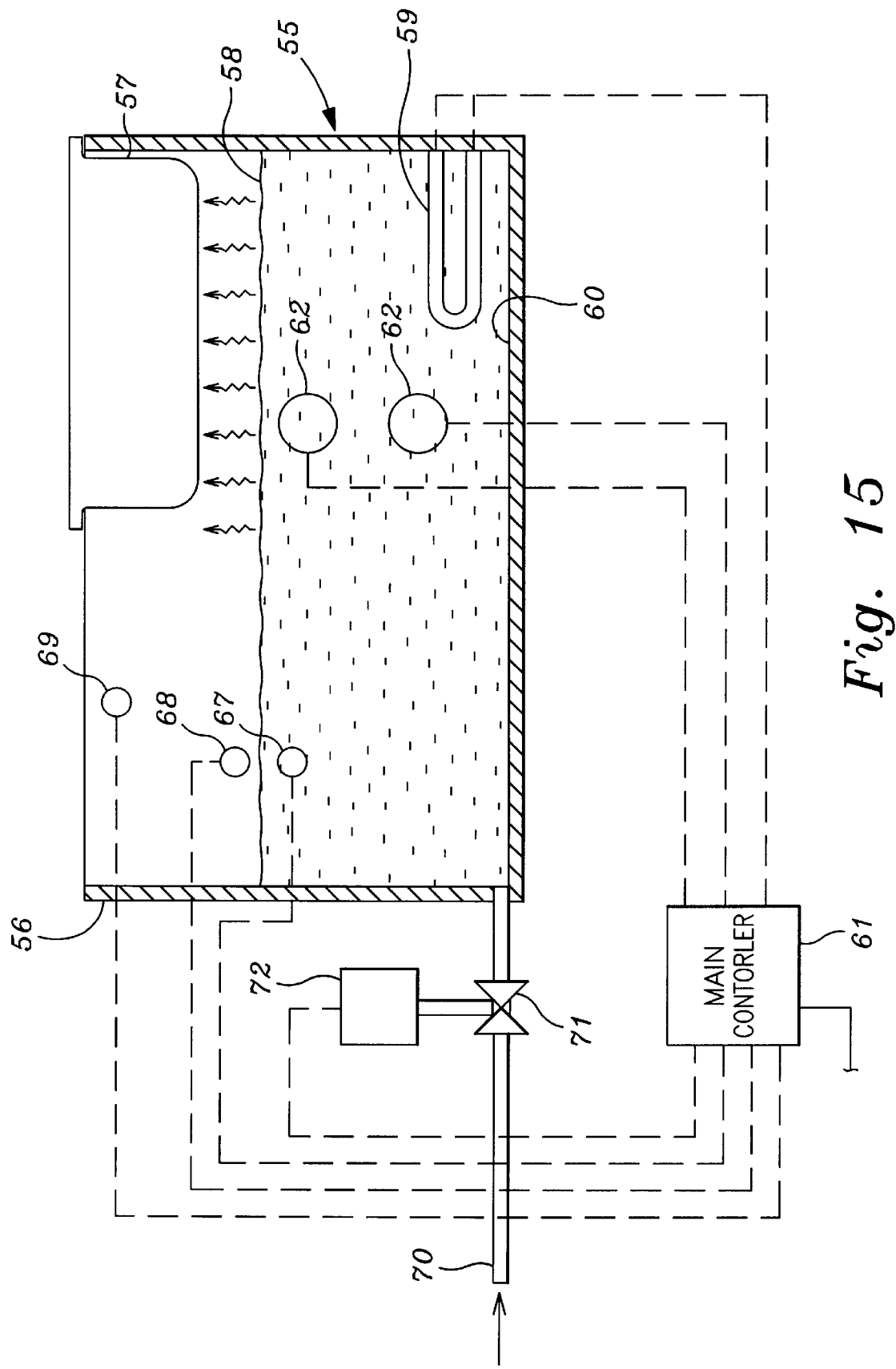
FIG. 15 is a partial sectional diagram of a heat table, water and heat input devices, probes, as well as main control.

Next, a description and operation of the invention focuses upon inventive equipment designs and methods of operation that include the systems and procedures of FIGS. 1–14. Referring to FIG. 15, schematic diagram 20 surrounding a sectional view of a steam table schematic repr PART 1.

The first system that we will be discussing is a steam table or hot solution holding tank. This system uses relay shaking, probe movement checking, probe feedback checking, disappearing equipment, pulse heating, and the AC energy sensor. FIG. 5 illustrates a schematic view of a holding tank portion of a steam table 55 is shown. Steam table 55 includes a holding tank 56 which would be located inside a larger structure (not shown) which supports food pans 57 and trays and is positioned such that hot water and steamy vapor from the holding tank 56 rises to heat the bottoms and sides of the food trays 57 evenly.

The holding tank 56 holds water having a water level 58 which must be maintained. Heating elements 59, one of which is shown and which is located in the lower portion of the tank 56, is usually below the water level 58. The heating elements 59 are located near a bottom 60 of tank 56, and may be connected to a main controller 61 which may preferably be wired to supply or direct heating current and voltage to the heating elements 59, or indirect heating current and voltage to heating elements 59 through an intermediate relay, particularly if one may be supplied with the steam table, and especially where the system of the invention is supplied and installed as a retrofit.

In tank 56, is also located a water level temperature probe 62 of which two are shown and which are preferably located under the water level 58 and will also be used to help indicate a low condition for the water level 58. The temperature probes 62 are also used to generate temperature data to adjust other components of the system, including total dissolved solids (TDS) meters 67 and 68 to compensate them for changes in temperatures. Details on a TDS meter may to be found in U.S. Pat. No. 5,581,189 issued on Dec. 3, 1996 to the inventor of the present invention and incorporated herein by reference. Other, generic total dissolved solids (TDS) meters which employ different principles are also commercially available. The temperature probes 62 are connected to the main controller 65.

Above the water level 58 is located an overflow meter 69 which is a shutdown override in the event that the other meters do not detect the tank filling because they are dirty, not connected, or out of calibration. The overflow meter 69 is also used to detect if the water solenoid has debris in it or is stuck on and overflowing the system. The overflow meter 69 should never, under normal circumstances, be triggered. A lower TDS meter 67 is installed and used to indicate a dangerous lower limit of water level 58 and in float mode a reference for the upper TDS meter 68. An upper TDS meter 68 is installed and used in the system to indicate when the water level 58 is at the appropriate level. All of the meters 69, 68, and 67 are connected to the main controller 65.

TDS meters 68 and 67 use the same technology, and overflow TDS meter 69 and temperature probes 62 are usually of a different technology. This creates a three way catch system that is inventive and unique. The TDS meters 68 and 67 use a calibration set point and reference system that determines when water is present. The overflow TDS meter 69 uses the maximum expected value as a reference and temperature probes 62 use the temperature data.

In the event that the TDS meters 68 or 67 are out of calibration range or not functioning, overflow TDS meter 69 will stop water from overflowing and a rapid drop in temperature can also be detected by temperature probes 62. A inventive auto calibration routine can also be set into place if TDS meters 68 and 67 are within a predetermined value from their respective readings, for example 20 degrees, that is above the previously set calibration point, and the overflow TDS meter 69 has been reached. The system of the invention would then save a new calibration point between the highest TDS reading attained by TDS meters 68 and 67, and an additional sum calculated that is under the maximum attainable value.

The controller 61 optimally monitors both water level 58 and temperature levels at the temperature probes 62 jointly and adds water where needed. The inventive idea of using TDS meters instead of the standard water AC or DC electric grounding out circuitry is unique in its ability to analyze what is going on at the probes. If there is water present at the probes, the TDS meters 69, 68, and 67 will register this and send back the correct readings for water being present at the probes. If something else like a calcium deposit is across the probe, it will read differently than the water, and it can be ascertained whether the meters 67, 68, & 69 need cleaning. If a metal object has shorted the system or if electrically it is not connected correctly, these conditions will also be detected.

This process of using water TDS meters 69, 68, and 67 to distinguish water levels from contaminates or bad wiring is called the water working system and is a great improvement upon existing technology. The existing systems can only tell if something is present or not. They cannot tell you if the substance present it is actually water, a calcium deposit, jumper wire, or a piece of food that is connected across the terminals of a level probe. This new method can distinguish debris across your probe because it is looking for an air reading or a water reading specifically (water has specific TDS ranges that are unique), rather than a simple on or off aspect. This is also an improvement on other level systems which use capacitance because such capacitive systems can be fouled by calcium buildup, food deposits, and are unable to detect when they need cleaning and can cause damage to the equipment or product. This ability to know when something is dirty, laying across the sensor probes, or just not wired correctly gives the inventive system a tremendously inventive advantage over the previous methods and equipment. Another unique feature about the water working system is that as the TDS meters 69, 68, and 67 become operational, the meters can use a float mode of operation and not be affected by changes in water TDS from day-to-day operation. This is very useful because the difference in the municipal or well water content and composition of dissolved solids can vary over a day or week. This float mode does not have a single cut off number for water present, but the float mode system uses the lower meter 67 as a reference for the upper meter 68. In this manner, the cut-off point can be 20 points above the lower meter reading; thereby, the system floats up and down on the water reference point from the lower probe. For example, let us assume the lower meter 67 is reading 30 (using 20 points), the system will not fill until the upper meter 68 reads above 50. This feature prevents the need to individually calibrate each and every unit in the field or have the set point be out of an optimum range because of water fluctuations. This feature greatly increases reaction time and accuracy of the level control.

Other components seen in FIG. 1 include a water inlet line 70 having a valve 71 which is controlled by a solenoid valve actuator 72 which is controllably connected to the main controller 61. The water inlet line 70 opens into the bottom of the tank 56, and although most of the water in tank 56 is expected to escape through evaporation around and through the food pan 57, the tank 56 may also be equipped with a drain (not shown) in order to perform gross cleaning operations or to flush the tank 56 if food is accidentally spilled within the tank 56.

The main controller 61 may also employ current sensors 21, 22, 23, or 24 of FIGS. 2–6 to detect if current is being used by the water solenoid and heating elements or gas system. From these current sensors 21, 22, 23, or 24 the system can verify the relays and check the heat sources are functioning within their specified parameters. For example if solenoid actuator 72 has a faulty coil or there is a worn heating element 59, the current sensor 21, 22, 23, or 24 will show a smaller than normal reading that will be picked up and an error code displayed. Knowing this information the main controller 61 can determine how critical or n on-critical the situation is. One example may involve a difference sensed in a case where the heat relay (not shown) or other control to the heating element 59 is stuck in the on position or if the heat relay is stuck in the off position. If the heat relay is stuck in the on position, the system would have a non-critical error because it can still keep food hot. However, if a heating element relay were stuck in the off position, the system would be unable to keep food at the proper temperature causing a critical failure situation.

The central controller 61 is shown with one communication line extending off of its physical situs, so that it can coordinate with other pieces of equipment, other controllers, and possibly report to a management headquarters, or to management at the local facility level, or all of the foregoing. Central controller 61 may use various methods to inform the users that something is going wrong with the equipment: a digital display on the controller 61 unit, flashers that indicate critical and non-critical problems, beeper or voice for audio warnings and information, and the communications connection or port that is shown in FIG. 15 which can even allow an outside source to gather error code information, change equipment settings, and monitor the data. If the sensors thus discussed are getting the wrong readings, the appropriate error codes may come up across the display and flashers, if present, will flash the appropriate warnings as well as perhaps a voice or buzzer. The inventive use of these sensors in the system is how they are read and used. Over time the current sensors, temperature probes, and TDS meters 67, 68, 69 when working properly fluctuate their values over time. The system checks for these fluctuations during the standard operation to verify they are working. If these fluctuations are not present, it is easily determined whether or not the sensing device is not working, a part on a physical circuit board has malfunctioned, or if someone has replaced the sensor with the wrong part. This inventive way of tracking for sensor fluctuations inside the sensor data lets us know that the sensor is working properly. If the system holds a constant reading without fluctuations, it can be automatically determined if there is a problem with the sensor. This will then be, once it is publicly available the standard embodied in the term "best verifiable logic" because the main controller 61 is monitoring the best valid data possible. By eliminating the need to depend solely upon a sensor that is stuck, a jumped sensor, or a broken part on the control, it can be assured that the sensors are working, which allows for the high degree of safety and accuracy of the control not achieved before.

A control is only as good as its sensors. In previous art, if one sensor is getting the wrong reading, it can kill the system. This system eliminates the single point of failure. The term "verifiable" in the phrase "best verifiable logic" indicates that at least some sensor or probes of different technologies or set points need to verify the truth of a sensor's readings. Otherwise, it will be ignored by the system and an error code will result. For example, if the safety TDS meter 67 indicates that no water is present, while the upper TDS meter 68 states that water is present and there is good temperature, it is then known that water is present and the system is still under operable conditions. This is just one scenario.

The "logic" aspect of "best verifiable logic" may be used as an example in calculating when it is safe to heat and when it is unsafe to operate. A number (for example 1) can be an assigned value to the proper temperature, the safety TDS meter 67 water reading, the upper TDS meter 68 water reading, or the overflow TDS meter water reading. For example, if we get a reading of 2 (safety TDS meter 67=1+upper TDS meter 68=1=2 total) or greater, it has been verified that water is present and the system can heat.

If the main controller 61 is using an electric system or if it uses more than 1 element 59, once temperature is reached, it can save energy costs and element lifetime by alternating the use of elements sequentially among each of the elements 59 at a time to keep the unit of FIG. 15 at temperature. Since the water temperature only changes slightly over time, this is a feasible option when the system does not need to fill or temperature does not drop very rapidly. In prior art the systems typically turn on all the elements or turn them all off. This creates large overshoots and undershoots in temperature. By alternating the elements once at temperature, it does not need to put so much energy into the system. In addition, the pulse heating methods from FIGS. 9–12 can be used. This is a far better way to regulate temperature more accurately.

Figure 16:
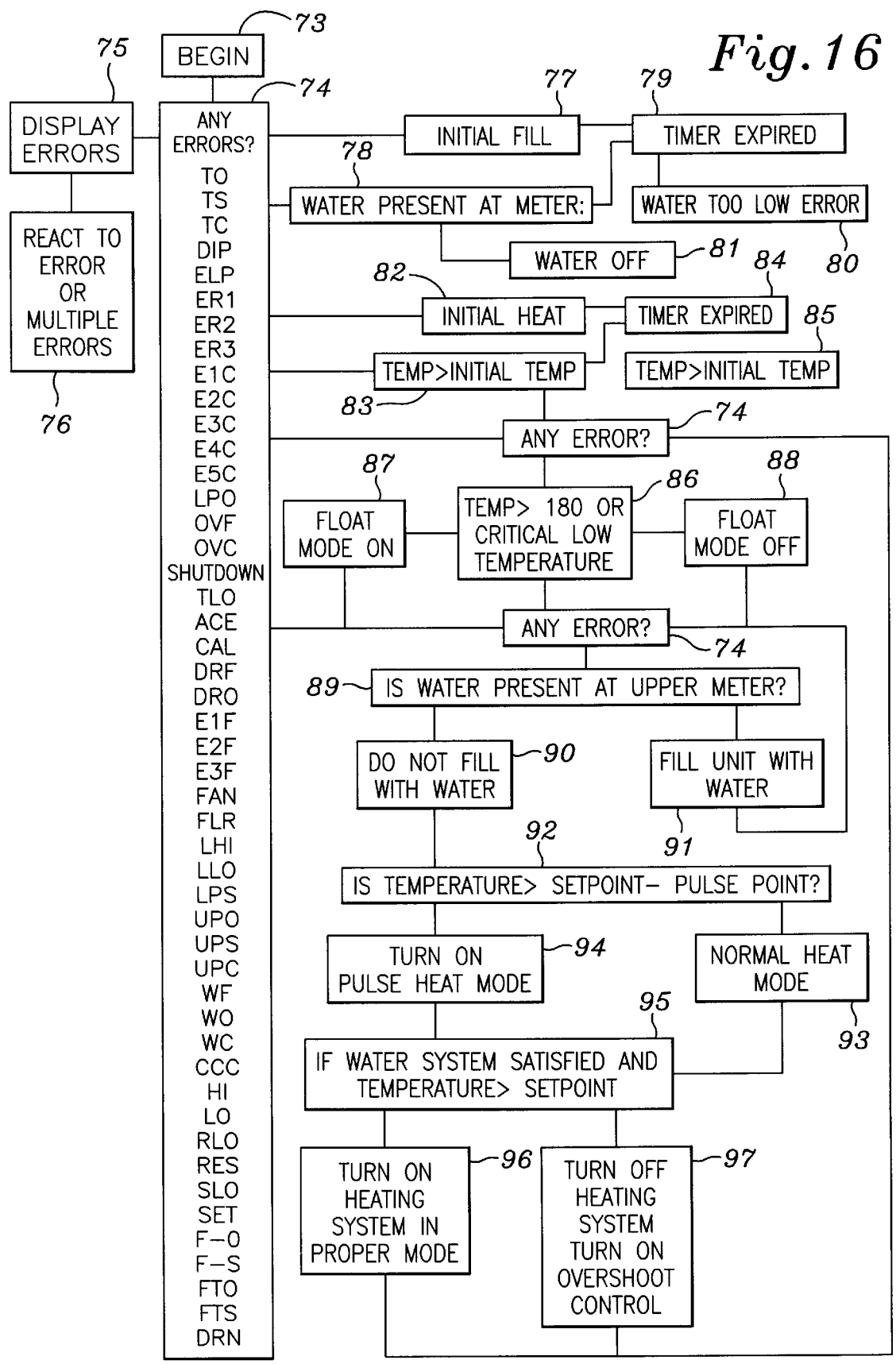
FIG. 16 is a process flow block diagram related to the initialization of operation of the heat table of FIG. 15, initial checking of probes and maintenance of proper operation and handling of error conditions.

FIG. 16 is a process control diagram which illustrates one implementation of the control of the present invention to control processes from filling to heating up to temperature for the system of FIG. 15. Beginning with a BEGIN block 73, the logic then flows to an ANY ERRORS? block 74 where the main controller 61 begins with checking for any errors which are listed in short notation format in ANY ERRORS? block 74. If there are errors, the main controller 61 may display them by sending a logic signal to a DISPLAY ERRORS logic block 75, followed by appropriate action with logic leading to a REACT TO ERROR OR MULTIPLE ERRORS logic block 76. The reaction may involve instructing local personnel to take action, or notifying in-house or contract repair personnel, or for very minor problems or a trend showing degradation of a sensor, merely increment a counter used to indicate the time for regular maintenance and move it more immediately toward the present.

From the ANY ERRORS? block 74, if there are no errors or non-stopping errors, logic flows to an INITIAL FILL block 77. The system main controller 61 logic then flows to a WATER PRESENT AT METER? block 78 where the main controller 61 then inquires if water is present at TDS meter 67. If not it, the logic flows to a TIMER EXPIRED block 79 where the main controller 61 looks to see if the fill time has been exceeded. If so, the logic proceeds to a WATER TOO LOW ERROR block 80. If not it returns to INITIAL FILL block 77 from which the logic can again begin.

From the WATER PRESENT AT METER block 78, the logic flows to a WATER OFF block 81. If water is present at the TDS meter 68, the system the main controller 61 will execute a turn off the water command sent to the valve controller 72. The system logic then flows to the INITIAL HEAT block 82 where the main controller 61 of the system begins initial heat of the heating element 59. The logic then flows to a TEMP>INITIAL TEMP block 83. If the temperature is less than the initial temperature, the main controller 61 causes the logic to flow to a TIMER EXPIRED block 84 where the main controller 61 checks if the time for heat up has expired. If the time elapsed is less than the time allotted for heat up, the main controller 61 logic flows to a TEMP TOO LOW ERROR block 85 which gives the error that the temperature is too low. If the heat up time has not expired, the logic flow continues back to INITIAL HEAT block 82 which continues with initial heating of the element 59, and then again to the TEMP>INITIAL TEMP block 83. If temperature is greater than initial temperature, the main controller 61 causes the logic to flow to an ANY ERRORS block 74, the same logic block underneath the BEGIN block 73, and where the same errors are again checked. If there are no errors, the logic flows to a TEMP>180 OR CRITICAL LOW TEMPERATURE block 86 where the main controller 61 checks to make certain that the temperature is above a critical low temperature. If it is above the critical low temperature, the logic leads to a FLOAT MODE ON block 87. If temperature is less than critical low, the logic leads to a FLOAT MODE OFF block 88. Logic from both blocks 87 and 88 lead back to an ANY ERRORS block 74 where the same full list of errors is again checked for. If there are no errors, the logic continues to an IS WATER PRESENT AT UPPER METER? block 89. If water is present at the upper meter 68, the main controller 61 will direct the logic to a DO NOT FILL WITH WATER block 90, and the holding tank 56 will not fill with water. If the holding tank 56 is not full with water, the logic is directed to a FILL UNIT WITH WATER block 91 where filling is accomplished. The logic then flows back to the ANY ERRORS block 74 and back to the IS WATER PRESENT AT UPPER METER? block 89.

From the DO NOT FILL WITH WATER block 90, the logic moves to an IS TEMPERATURE>SET POINT-PULSE POINT? block 92, if the system does not need to fill, as it then checks the temperature. If the temperature is less than the set point minus the threshold level at which the heating element 59 is to be energized, main controller 61, normal heating is directed via logic flow to NORMAL HEAT MODE block 93. If the temperature is greater than the set point minus pulse point, the logic is directed to a TURN ON PULSE HEAT MODE block 94.

Both the TURN ON PULSE HEAT MODE block 94 and the NORMAL HEAT MODE block 93 lead to an IF WATER SYSTEM SATISFIED AND TEMPERATURE<SET POINT block 95. If the water system is satisfied and the temperature is less than set point, the system logic is directed to a TURN ON HEATING SYSTEM IN PROPER MODE block 96 which turns on heating in the proper mode and then checks for any errors as the logic is directed back to the ANY ERRORS block 74. If the temperature is greater than the set point, main controller 61 directs logic to a TURN OFF HEATING SYSTEM TURN ON OVERSHOOT CON- TROL block 97, which turns off the heating system and turns on the overshoot control 93 as the logic is directed back to the ANY ERRORS block 74.

Figure 17:
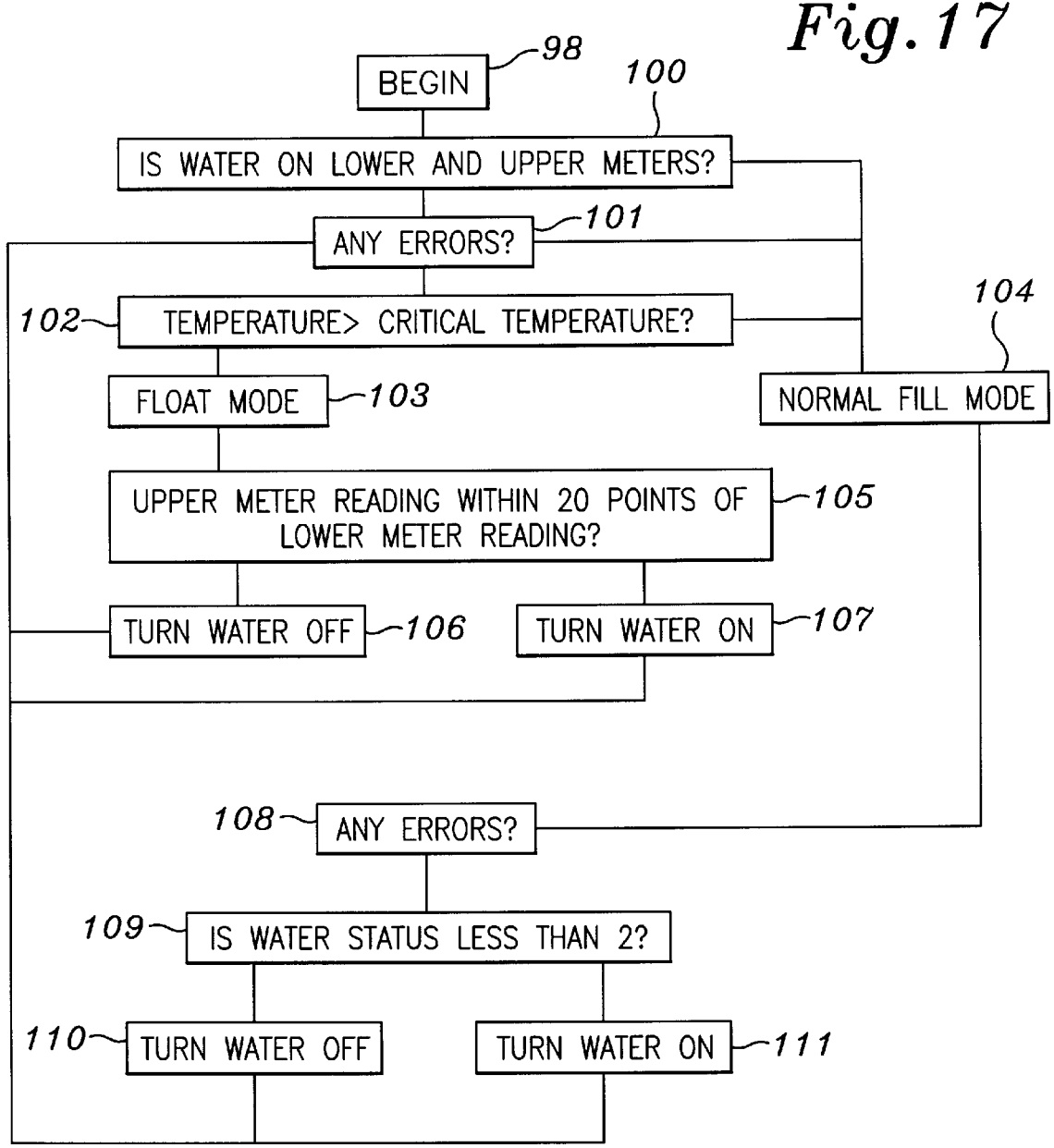
FIG. 17 is a process flow block diagram related to measuring the state of water in the feedback checking of probes.

FIG. 17 is a flow diagram describing the float and normal filling operation of the control process performed by main controller 61. From a BEGIN block 98, the logic is directed to an IS WATER ON LOWER AND UPPER MATERS? block 100, where the main controller 61 checks that there is water on the lower and upper tds meters 67 & 68. Then main controller 61 causes the logic to flow to an ANY ERRORS block 101 where it checks for errors before going further. If no errors are detected at the ANY ERRORS BLOCK 101, the logic flows to a TEMPERATURE>CRITICAL TEMPERATURE? block 102. Block 102 tests the temperature, and if the temperature is greater than the critical temperature, logic is directed to a FLOAT MODE ON block 103 where the float mode is activated.

A no result at the IS WATER ON LOWER AND UPPER MATERS? block 100, a yes result at the ANY ERRORS block 101, or a no result at the TEMPERATURE>CRITICAL TEMPERATURE? block 102 leads logic to a NORMAL FILL MODE block 104.

From the block 103, the logic leads to an UPPER METER READING WITHIN 20 POINTS OF LOWER METER READING block 105. Here, if the upper meter reading is within 20 (any value for reference) points of lower meter reading 105, logic continues to a TURN WATER OFF block 106 where the water is turned off, typically through the valve 71 of FIG. 15. Otherwise, the logic flows from block 105 to a TURN WATER ON block 107 where the water is turned on. The logic from both of the blocks 106 and 107 lead back to the ANY ERRORS block 101.

F rom the NORMAL FILL MODE block 104, the logic leads to an ANY ERRORS block 108, where the presence of errors are again checked. The logic then leads to an IS WATER STATUS LESS THAN 2 block 109 where main controller 61 checks to see if water status is less than 2 points on our assigned points system. If it is more than 2 points, the logic flows to a TURN WATER OFF block 110. If not greater than 2 points, logic flows to a TURN WATER ON block 111. Logic then flows back to the ANY ERRORS block 101.

Figure 18:
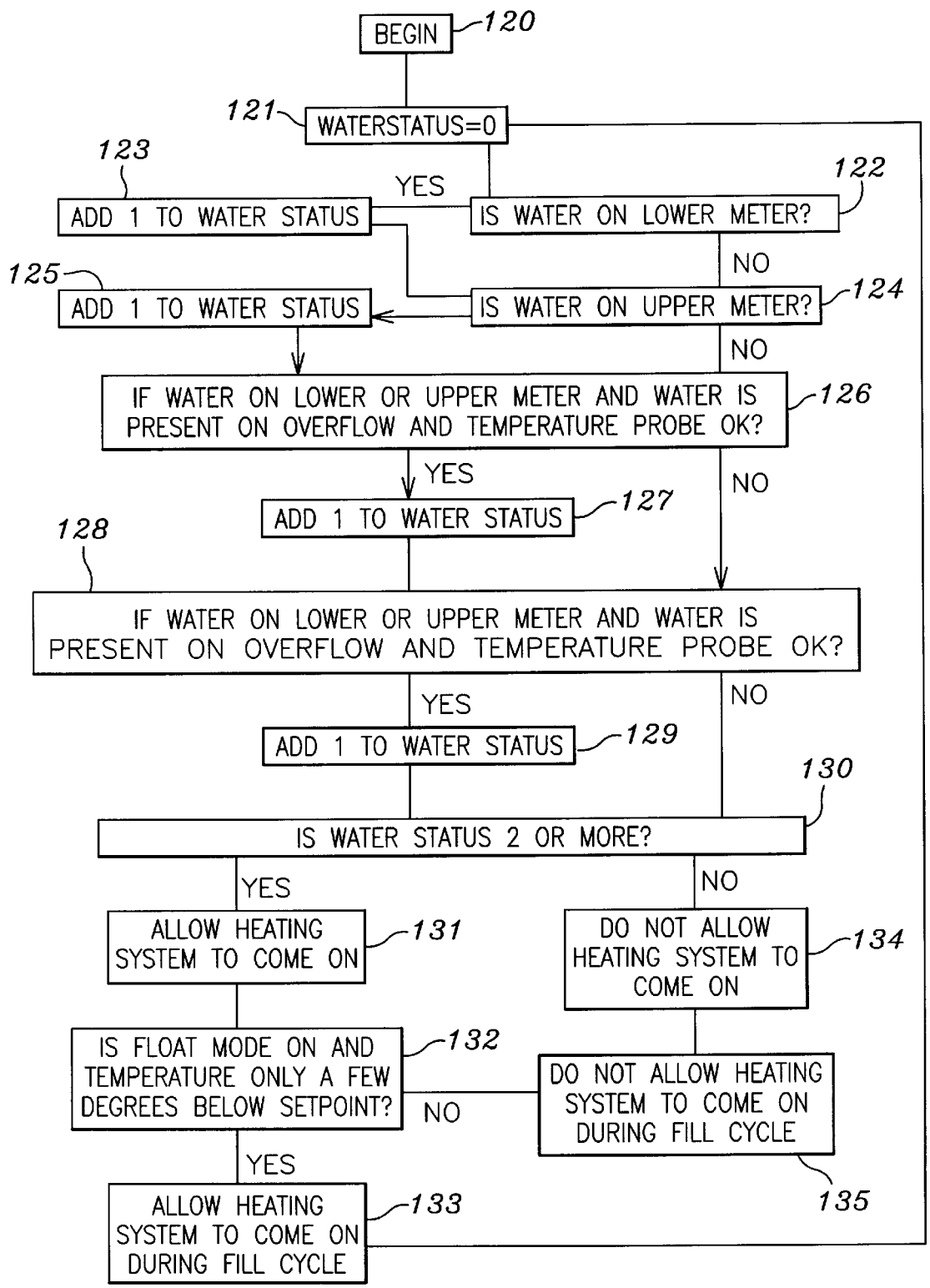
FIG. 18 is a process flow block diagram related to the use of a numerical status summing amount to ascertain the magnitude of problems of the heat table of FIG. 15.

FIG. 18 is a flow diagram describing how the system calculates the overall health of the water fill system and when the system can heat. It begins at BEGIN block 120 and logic flows to a WATERSTATUS=0 block 121 which initializes the water status variable to 0 points. Then logic flows to an IS WATER ON LOWER METER? block 122 where the main controller 61 checks the lower tds meter 67 and determines if water is present and if so, directs logic to an ADD 1 TO WATER STATUS block 123 where main controller 61 adds a number (1) to water status point count. A no answer at block 122, as well as a natural logical flow from block 123 leads to an IS WATER ON UPPER METER? block 124. In block 124, main controller 61 checks the upper tds meter 68 and determines if there is water and if so the logic leads to an ADD 1 TO WATER STATUS block 125 which causes a number (1) to be added to the water status point total. Logic from block 124 through a no answer, or naturally from block 125 lead to an IF WATER ON LOWER OR UPPER METER AND WATER IS PRESENT ON OVERFLOW AND TEMPERATURE PROBE OK? block 126 where main controller 61 checks to make sure water is present on lower tds meter 67 or present on the upper tds meter 68 and water is present on the overflow tds meter 69 and the temperature probe 62. A yes result causes logic to flow to an ADD 1 TO WATER STATUS block 127 where the water point system is incremented. Logic next naturally flows an IF FLOAT MODE IS ON AND SYSTEM IS ABLE TO FILL AND TEMPERATURE IS GREATER THAN A FEW DEGREES BELOW THE SET POINT block 128, where the main controller 61 checks if the float mode is on. Logic also reaches block 128 on a no answer from block 126. If the answer at block 128 is yes, logic flows to an ADD 1 TO WATER STATUS block the water status point number is incremented by one. Logic then leads from block 129 to an IS WATER STATUS 2 OR MORE? block 130, and also from block 128 on a no answer.

At this important stage, a "yes" answer leads to an ALLOW HEATING SYSTEM TO COME ON block 131, providing that the water status is 2 or more. The logic then flows to an IS FLOAT MODE ON AND TEMPERATURE ONLY A FEW DEGREES BELOW SET POINT block 132, and a yes answer will lead the logic to an ALLOW HEATING SYSTEM TO COME ON DURING FILL CYCLE block 133 where the system of FIG. 15 can heat at the same time it is filling.

A "no" answer at block 130 leads to a DO NOT ALLOW HEATING SYSTEM TO COME ON block 134 which is a safety lockout condition. Natural logic from block 134 and a "no" answer from block 132 lead to an DO NOT ALLOW HEATING SYSTEM TO COME ON DURING FILL CYCLE block 135 and system will turn off the heat when filling. Logic from both of the blocks 133 and 135 lead back to the block 121.

Figure 19:
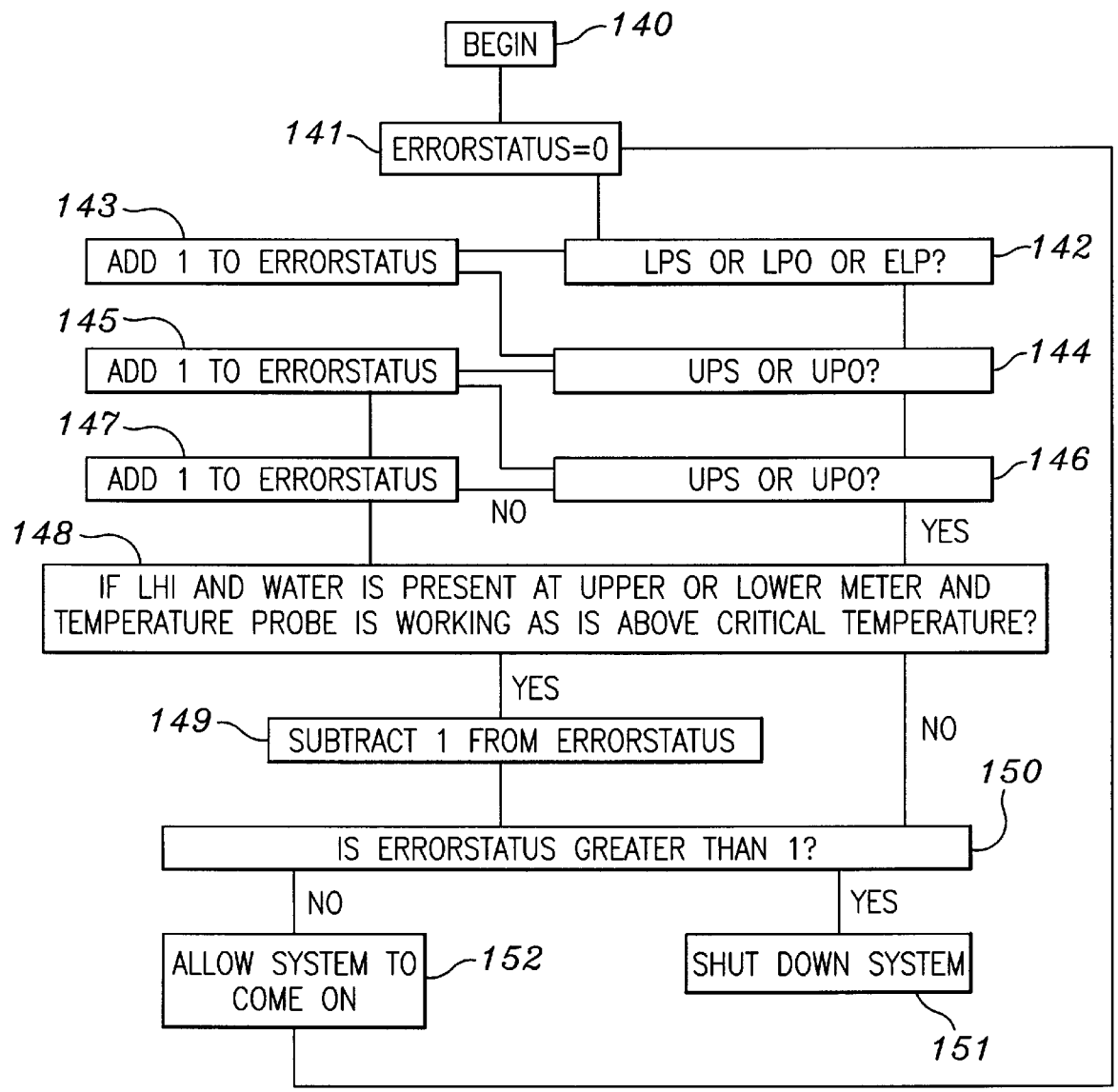
FIG. 19 is a process flow block diagram related to the use of a numerical error status summing amount to ascertain the magnitude of problems of the heat table of FIG. 15.

FIG. 19 is a flow diagram describing how the system calculates water fill errors and when the system will shut down for safety. Logic begins at BEGIN block 140 and logic flows to an ERROR STATUS=0 block 141 which initializes the water status variable to 0 points. Then logic flows to an LPS OR LPO OR ELP? block 142 where the main controller 61 checks the system check for errors LPS (Lower tds meter is shorted) or LPO (Lower tds meter is open) or ELP (Error filling when water levels went under the lower tds meter). A "no" result, directs logic to an ADD 1 TO ERRORSTATUS block 143 where main controller 61 adds a number (1) to the error status point count. A no answer at block 142, as well as a natural logical flow from block 143 leads to an UPS OR UPO block 144 where the main controller 61 goes on to check for errors UPS (upper tds meter shorted) or UPO (upper tds meter open). If there are no problems, the logic leads to an ADD 1 TO ERROR STATUS block 145 which causes a number (1) to be added to the error status point total. Logic from block 144 through a no answer, or naturally from block 145 lead to an TO OR TS block 146 where main controller 61 checks to make sure there are no errors TO (temperature probe open) or TS (temperature probe shorted). A "no" result causes the logic to flow to an ADD 1 TO ERROR STATUS block 147. A yes result at block 146, or natural logic flow from block 147 leads to an IF LHI AND WATER IS PRESENT AT UPPER FOR LOWER METER AND TEMPERATURE PROBE IS WORKING AS IS ABOVE CRITICAL TEMPERATURE? block 148, where if the system now detects LHI error (an overflow) and water is present at the upper tds meter 68 or the lower tds meter 67 and the temperature probe is working and is above the critical temperature. If this is the case, the logic leads to a SUBTRACT 1 FROM ERROR STATUS block 149 and the main controller 61 subtracts a point from error status point total.

The logic then flow naturally from block 149 or on a "no" answer from block 148 to an IS ERRORSTATUS GREATER THAN 1? block 150. Controller 61 then checks if the errorstatus point total is greater than one. If "yes" answer if found, the logic leads to a SHUT DOWN SYSTEM block 151. If a "no" result is found, the logic leads to an ALLOW SYSTEM TO COME ON block 152. Logic from both of blocks 151 and 152 lead back to block 141. This procedure will shut the system operating in FIG. 15 down for safety reasons because it is not sure if water is present. If is it sure that water is present it will allow the system to continue operation.

Figure 20:
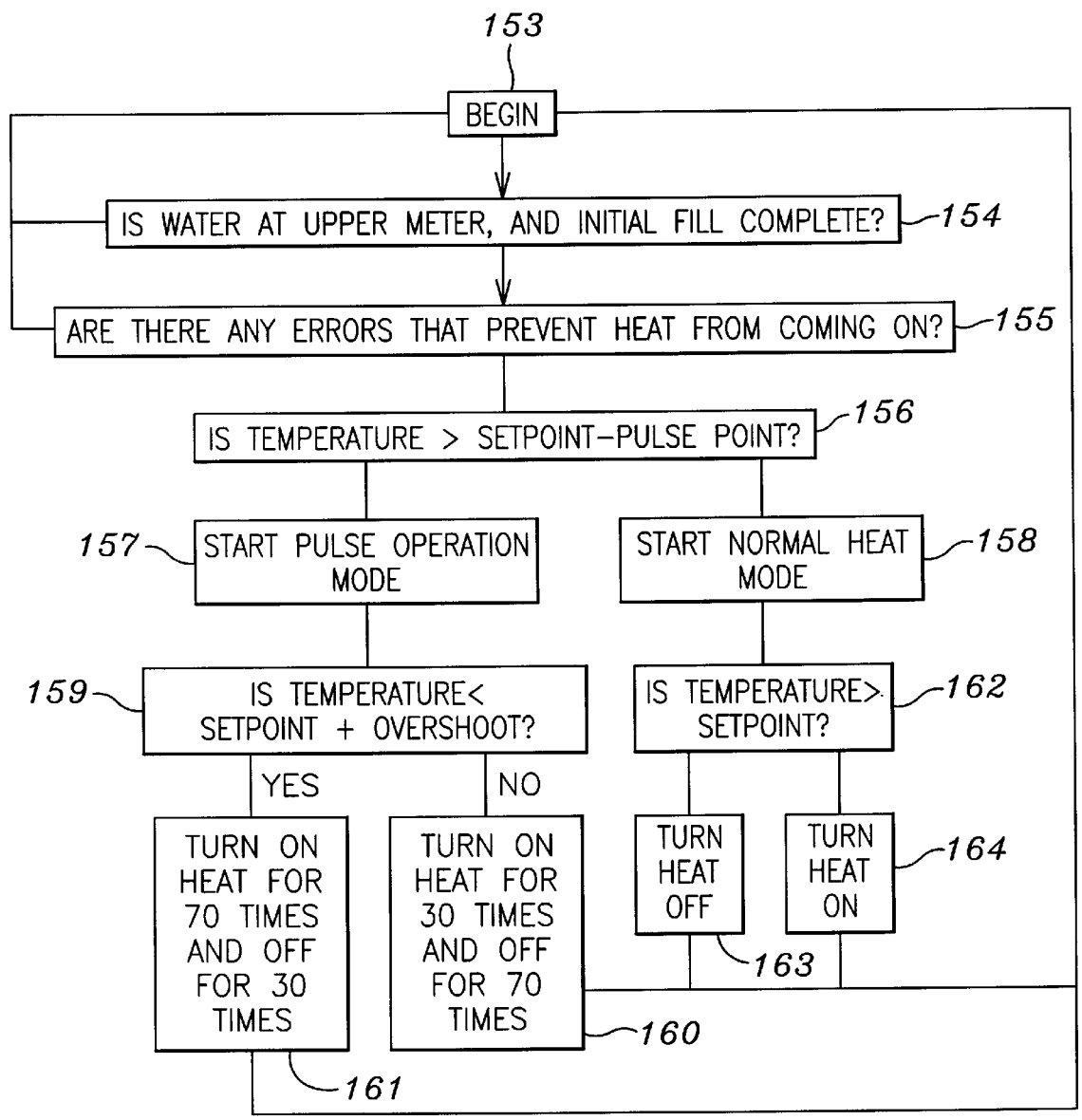
FIG. 20 is a process flow block diagram related to the use of a heating logic flow to properly maintain heat in the heat table of FIG. 15.

FIG. 20 is a block flow diagram describing how the system decides between normal heat mode and pulse operating mode. There are two types of pulse operating modes. One type deals with pulsing current, and the other type deals with pulsing the system by turning on and off a relay. The reason for this distinction is that some systems are connected with on/off relays, and others are connected with current controlling relays that vary the amount of current used and never turn off. The inventive system can be used in both systems One turns the system on and then off to create the pulse, and the other quickly increases the current and then reduces it to create the pulse. By pulsing the heating system. It can create a balancing system that holds the temperature to an exact point. The heating system injects heat into the steam bath, dry heat well, or refrigerated system in small amounts to maintain the proper balance. This unique approach can keep temperatures at almost exact levels never achievable with previous technologies.

Referring again to FIG. 20, logic begins at BEGIN block 153 and logic flows to an IS WATER AT UPPER METER, AND INITIAL FILL COMPLETE? block 154. A "no" result leads back to the BEGIN block 153. A "yes" result leads to an ARE THERE ANY ERRORS THAT PREVENT HEAT FROM COMING ON block 155. A "no" result leads back to the BEGIN block 153. A "yes" result leads to an IS TEMPERATURE >SET POINT-PULSE POINT? block 156. If the temperature is in an acceptable range, main controller 61 causes the logic to flow to a START PULSE OPERATING MODE block 157 where pulse heating begins. Otherwise, the logic flows to a START NORMAL HEAT MODE block 158.

From block 157, the logic flows to an IS TEMPERATURE<SET POINT+OVERSHOOT? block 159. As an example, a "yes" answer leads to a TURN ON HEAT FOR 30 TIMES AND OFF FOR 70 TIMES block 160. A "no" answer leads to a TURN ON HEAT FOR 70 TIMES AND OFF FOR 30 TIMES block 161. Block 160 turns on the heat full blast for 70 cycles out of 100 and turns off heat for 30 cycles. Block 161 turns the heat on 30 cycles out of 100 for heat on and 70 cycles off. Notice that in this system it heats even above the set point which is unique in this field. In normal mode if the temperature is greater than the set point 159, it turns the heat off or if the reverse turns the heat on.

From block 158, the logic flows to an IS TEMPERATURE>SET POINT? block 159. As an example, a "yes" answer leads to a TURN HEAT ON block 163. A "no" answer leads to a TURN HEAT OFF block 164. Logic from blocks 160, 161, 163 and 164 lead back to BEGIN block 153.

Figure 21:
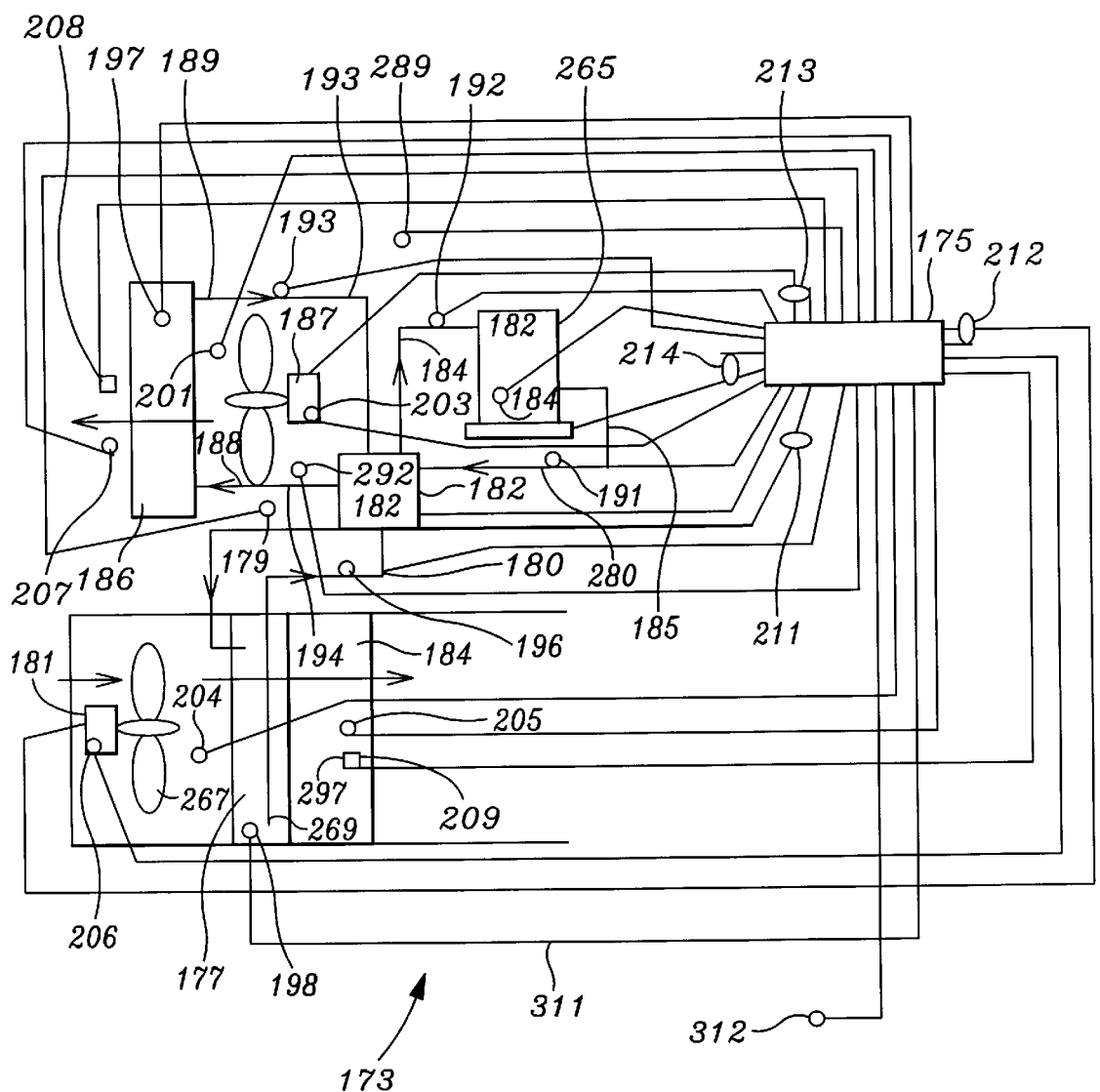
FIG. 21 is a schematic and control diagram for a basic refrigerator/freezer cooling system and which uses the sensors previously described.

Referring to FIG. 21, a drawing of a basic refrigeration/freezer cooling system 173 with inventive sensors applied, is illustrated. FIG. 21 depicts a way of finding out what is going on inside a cooling system without tapping into the refrigerant lines. The system uses relay shaking, probe movement checking, probe feedback checking, disappearing equipment, pulse cooling, best verifiable logic, the cooling potential sensor, and an AC energy sensor.

A main control 175 is used to controls the operation and diagnostic information from the variety of sensor inputs used. During normal operation, a chiller unit 177 receives a supply of cold refrigerant and provides heat exchange for chilling air or cold fluid using refrigerant supply line 179, and refrigerant return line 180. A motorized fan 181 i s used to direct air through the chiller 177 and into an area to be cooled.

Lines 179 and 180 are connected into a valved switching unit 182, to control the flow of the refrigerant, to change the flow path in the system and which is especially useful in a freezer to reverse the flow of fluid/freon in the system to de-ice the chiller 177. A compressor 183 has an inlet line 184 and an outlet line 185. Both lines 184 and 185 are also connected in fluid communication with valved switching unit 182. Also seen is a condenser unit 186 having heat exchange capability and in contact with ambient air driven across the condenser unit 186 by a fan 187. Condenser unit 186 has an inlet line 188 and an exit line 189.

The condenser 186 cools the freon from the compressor 183. When the chiller 177 needs de-icing, the valved switching unit 182 can direct hot compressed refrigerant through the chiller 177 in order to de-ice it.

The system uses temperature probes, including temperature probe 191 on the outlet line 185, temperature probe 192 on the inlet line 184, temperature probe 193 on the exit line 189, temperature probe 194 on the inlet line 188 to the condenser 186, temperature probe 195 on refrigerant supply line, temperature probe 196 on refrigerant return line 180, all of which measure the temperature of the flowing refrigerant. Other refrigerant related temperature probes include temperature probe 197 on the condenser 186, temperature probe 198 on the chiller 177 and temperature probe 199 on the compressor 183 which may measure the temperature of the compressor motor or other internals of the compressor 183.

The interaction of the system 173 with the air is measured with temperature probe 201 to measure ambient air going into the condenser 186 and temperature probe 202 to measure the temperature of air leaving the condenser 186. A temperature probe 203 measures the temperature of the motor of the fan 187. Likewise for the chiller 177, temperature probe 204 to measure ambient air going into the chiller 177 and temperature probe 205 to measure the temperature of air leaving the chiller 177. A temperature probe 206 measures the temperature of the motor of fan 181. In addition, a cooling potential sensor 208 is placed at the exit air of the condenser 186 while a cooling potential sensor 209 is placed in the outlet cool air stream leaving the chiller 177. In addition, AC current sensors 211, 212, 213, and 214 are placed onto the power lines leading to the chiller unit 177 fan 187, motorized fan 181, compressor 183, and condenser unit 186 fan 187.

Main control 175 monitors the compressor/pump 183 to insure that it has been turned on properly and how much current it is using through AC current sensor 214. The control 175 diagnoses if the fans 181 and 187 has turned on properly and how much current they are using through AC current sensors 212 and 213. The control 175 monitors the temperature of the compressor/pump 183 with temperature sensor 199. The control 175 monitors the temperature of the fans through temperature sensors 206 and 203. The control 175 monitors the temperatures of the refrigerant lines via temperature probes 191–196. The main control 175 calculates the change in temperature across the condenser 186 and chiller 177. The main control 175 uses cooling potential sensors 208 and 209 to measure the cooling capacity of the condenser 186 and the cooling capacity of the chiller 177.

The control 175 has the ability to analyze if fans 187 and 181 are not working in several ways. First, the control 175 can monitor the current usage of the fans 187 and 181. If a fan's current usage jumps or falls (depending on the type of motor), an obstruction has stopped the fan 187 or 181. If the fans 187 or 181 do not use current, there may have been a disconnection. If the fans windings and insides are not working properly, the control will pick up out of normal current reading and perhaps an increase in fan temperature at sensors 203 or 206. If the fan 187 or 181 has a blade loose, the temperature sensors 203 or 206 may pick up an increased temperature due to increased friction. In addition, the cooling potential sensor 208 or 209 will give an additional indication of problem with air flow. Temperature sensors 191–196 will pick up a shift in the temperature displacements across the condenser 186 and chiller 177.

The control 175 also has a table of normal fan operational parameters to uses against input it gets to evaluate problems by comparing the expected normal readings with the actual readings. The system 173 uses a unique method of utilizing the fans that may be referred to as called air flow factoring. Air flow factoring is a unique fan usage that uses the systems fans and their ability to control system dynamics. By increasing or decreasing fan 187 or 181 speeds via the standard switch or by pulsing the power supply current on and off, changes in the cooling rate and cooling ability of the system 173 can be measured. By sensing how the system 173 is running, where the heat is concentrated, how the refrigerant is flowing through in the system, the control 175 can optimize the systems operation for its condition and keep it in peak condition longer than under normal conditions. Air flow factoring varies the air flow across the condenser 186 and chiller 177 coils, which changes the dynamics of the cooling system. Because air flow factoring has the ability to change the cooling dynamics of the system, when outside influences such as heat or humidity change, or where system breakage or wear occurs, the control 175 will adjust to a new system optimum which will keep the system 174 running smoother and prevent a total shut down if possible. For example if the system 173 is low on refrigerant, the fans 187 and 181 will need to be varied to prevent ice up of the chiller 177. One method would be to increase the air flow across the chiller 177 and decrease the air flow across the condenser 186. If needed, the control 175 can direct the valved switching unit 182 to change flow to de-ice the chiller 177. Control 175 can run the compressor/pump 183 less to compensate for the problem. This keeps the system 173 minimally operating until service can arrive. This air flow factoring (increasing/decreasing the fan speeds, pulsing them on/off as well as conventional means), compressor on times, valve switching times is inventive to this industry. The ability for an system 173 to optimize itself under non-optimum running conditions is inventive in this field using the inventive sensor and control configurations shown.

In addition, the control 175 has the ability to analyze the pump/compressor 183. It reads the amount of current that the unit is using via energy sensor 214. If the compressor 183 is having problems with its internals, the amount of current that it uses will rise and fall depending on the failure. It also uses temperature sensor 199 to evaluate how hot the pump/compressor 183 is receiving and if it needs to shut down to avoid damage, it can do so. Control 175 also analyzes the incoming and outgoing refrigerant temperatures to the compressor 183 to give the control 175 the ability to analyze the pump/compressor 183 health as well as freon or cooling material travel through the pump. For example, if something is broken inside the pump/compressor 183 where it cannot pump, but is still running, the pump will get hot as well as the incoming and outgoing lines. If freon is low in the system, temperatures will be higher in compressor operation and drastically different in the incoming and outgoing lines.

Valved switching unit 182 is a switch that the control uses to change the directional flows in the unit. It can reverse the freon/fluid flow through the compressor as well as the condenser and chiller. This is useful when ice gets on the condenser to de-ice the system. What makes this unique is its ability to work with the control 182 to change the operation of the system when something goes wrong. Examples of the information from the different sensors can transform into the following:

COMPRESSOR TOO HOT=Compressor 182 associated temperature probe 199 senses the system is running too hot.

CONDENSOR IS BLOCKED=Cooling potential sensor 208 shows blockage, change in temperature is high on the condenser 186 and low on the chiller 177, and amperage goes up on the compressor 183.

CHILLER IS BLOCKED=Cooling potential sensor 205 or 198 shows blockage, change in temperature is low on the condenser 186 and high in the chiller 177, and amperage goes up on the compressor 183.

LOW REFRIGERANT=Icing up of the chiller 177, change in temperature is low in both the condenser 186 and chiller 177, and amperage at the compressor 183 drops with an increase in temperature.

COMPRESSOR FAILURE EMINENT=Change in temperature is okay, there are no blockages detected from cooling potential sensors 208 or 209, and the compressor 183 is running too hot.

BOX TEMPERATURE LIMIT IS TOO HIGH=System 173 is off too much of the time.

BOX TEMPERATURE LIMIT IS TOO LOW=System 173 is on too much of the time.

DOOR IS OPEN=Box temperature rises too fast or does not cool down or door sensor is triggered.

FILTER NEEDS TO BE REPLACED ON THE CHILLER OR CONDENSOR=Cooling potential sensor indicates a gradual decline in average air flow.

CONDENSOR OR CHILLER COILS NEED CLEANING= Cooling potential sensors 208 or 209 detects a gradual decline in the ability to cool, and the change in temperature differential across the coils of the chiller 177 are outside of normal.

DEFROST CYCLE FAILS OFF=Drop in the temperature differential across the condenser 186, an increase in the temperature differential across the chiller 177, amperage drops on the compressor 183, and the chiller 177 could be icing up.

DEFPOST CYCLE STUCK ON=No change in the temperature differential across the chiller 177, increase in the temperature differential across the condenser 186, increase in amperage draw on the compressor 183, and the chiller 177 is not coming down to temperature.

By employing these known and inventive sensors together to detect changes in temperatures, airflows, and current loads, it is known when the system 173 is working normally or if the control needs to induce the inventive measurement techniques to attempt to keep the system minimally operational while issuing a call for service in a particular area. This is inventive because it can detect subtle conditions without tapping into the freon/fluid system, which now costs large amounts of money and should be minimally disturbed because refrigerants such as freon are deemed a hazardous material. System 173 can detect when the system 173 is going down before food products are ruined and can self-optimize, which gives the operator time to make alternative arrangements. It also informs the operator not to stock or serve product from a faulty working piece of equipment. This inventive technology does not exist in the industry today. With current technology the operator will find failures only after the fact.

This system uses inventive pulse cooling, which is a reverse of pulse heating. The control can pulse the fans 181 or 187, compressor 183, and switch to a point where the cooling system 173 sends pulses of cooling to the target area, instead of heat as in pulse heating. It uses the same theories as pulse heating to level off the variations in temperature fluctuations to the absolute minimum.

Figure 22:
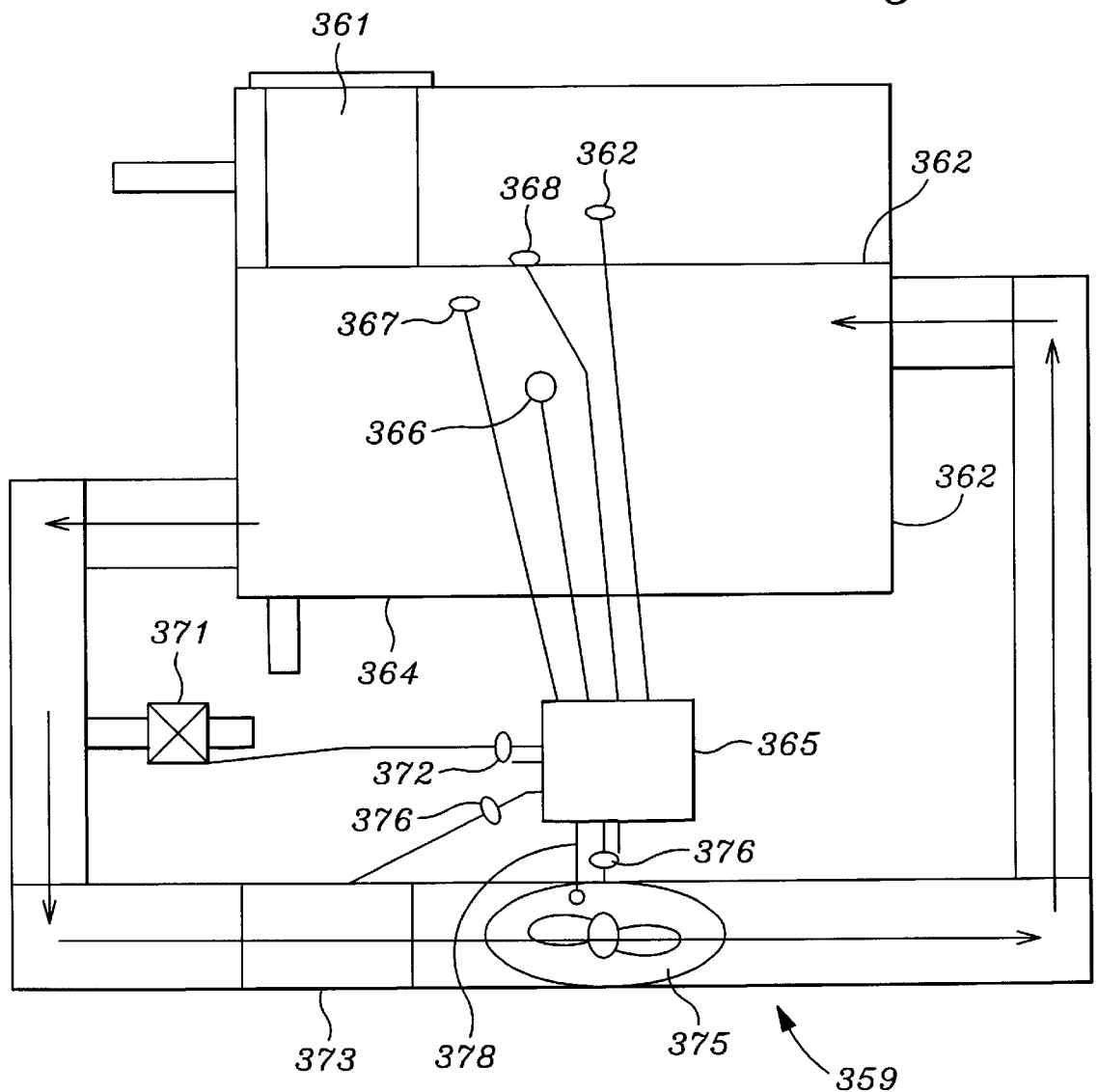
FIG. 22 is a drawing of a cooling well design that uses a chilled solution along with controlled and directed air flow.

Referring to FIG. 22 a schematic drawing of a cooling well or cooling table 359 using a chilled solution is seen. The system uses relay shaking, probe movement checking, probe feedback checking, disappearing equipment, water working system, air flow factoring, best verifiable logic, pulse cooling, AC energy sensor, cooling potential sensor, as well as the cooling system in FIG. 13. This inventive cooling well design uses a chilled solution instead of the steam table that uses a hot solution. Like in the steam table the following parts and their function are identical to the steam table: a water holding tank 360, a pan insert 361, water level 362, bottom 364, main controller 365, temperature sensor 366, lower tds meter 367, upper tds meter 368, overflow tds meter 369, water relay 371, and water relay energy sensor 372. A parts cooling system 373, and pump 374 are also seen. The cooling table 359 requires a method of cooling. In order to do this, it was found to be necessary to insert tubing/piping that draws the colder water from the bottom through the cooling system 373 via pump 375 which then pushes it to the top of the cold bath. The cooling system 359 and methods referenced by FIG. 22 display the methods of cooling the water through a cooling system 373.

The fluid pump 375 is monitored by energy sensor 376 and temperature sensor 378. This system 359 takes advantage of the level holding ability of a water or fluid solution on the holding bins 361. These holding bins 361 can also be inserted into the moving water stream if needed.

Figure 23:
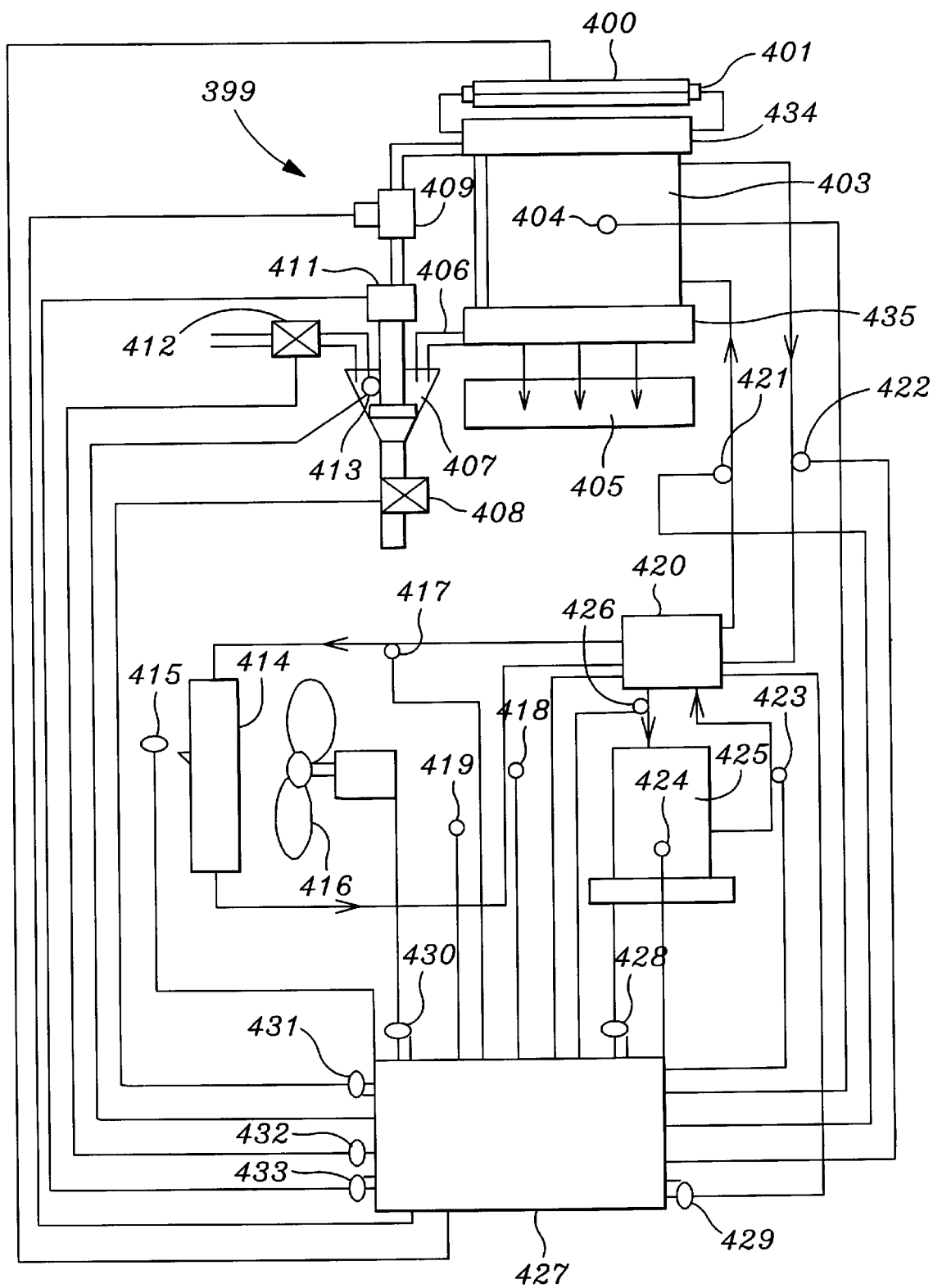
FIG. 23 a schematic and control of an ice machine design that is environmentally better for the environment by using typically half the amount of water with the same cube clarity and quality as well as being able to produce typically twice the amount of ice with the same size unit and which uses the sensors previously described.

Referring to FIG. 23, a schematic drawing of an ice machine design that is environmentally better for the environment by using typically half the amount of water with the same cube clarity and quality as well as being able to produce typically twice the amount of ice with the same size unit is shown. An ice machine system 399 uses relay shaking, probe movement checking, probe feedback checking, disappearing equipment, water working system, air flow factoring, best verifiable logic, pulse cooling, AC energy sensor, cooling potential sensor, as well as the cooling system seen in FIG. 21.

Referring again to FIG. 23, system 399 has a support beam 400 supporting weight sensors 401 and 402 A chiller plate 403 is a main structure upon which ice is formed and has a temperature sensor 404. Ice falls into a bin 405. Also seen is a hose 406, funnel, or cyclonically shaped holding tank 407, water release valve 408, tds sensor 409, hose 410, pump 411, valve 412, probes 413, condenser 414, cooling potential sensor 415, condenser fan 416, condenser supply refrigerant temperature sensor 417, condenser return refrigerant temperature sensor 418, temperature sensor 419, defrost valve switch 420, chiller refrigerant supply line temperature sensor 421, chiller refrigerant return line temperature sensor 422, compressor refrigerant supply temperature sensor 423, compressor temperature sensor 424, compressor 425, compressor refrigerant return sensor 426, control 427, compressor current sensor 428, defrost valve switch current sensor 429, condenser fan current sensor 430, water release valve current sensor 431, valve actuator current sensor 432, pump power current sensor 433, distributor 434, and catch 435.

The system 399 is broken up into two types of input to the control 427. The first is cooling sensors that work like those seen in FIG. 21. The second is the inventive sensors and systems that increase ice quality, cycle time, and decrease water usage.

The first inventive part consists of cooling sensors that work like those seen in FIG. 21 are the control 427, the switch 420, the compressor 183/pump 425, the condensor fan 416, the condensor 414, the chiller 403 (that cools the water to form ice, thereby eliminating the chiller fan). Temperature sensors are employed like in FIG. 13 in the locations 417, 418, 426, 424, 423, 421, 422, 404, and more could be added similar to FIG. 21. Current sensors are employed like those seen in FIG. 13 as current sensors 433, 430, 428, and 429. More could be added similar to those shown in FIG. 21. Rather than chilling air, this ice machine system 399 chills water to form ice cubes across the chiller. Then when the ice has formed in the proper time the system reverses the flow of coolant via valve switch 420 (instead of cooling the chiller plate it heats it up) to start a defrost type of operation that melts the ice a little and it drops into the bin 405 from the chiller plate. This system has all the diagnostic and optimizing features from FIG. 21 that are used in an ice machine. FIG. 23 demonstrates how the FIG. 21 features can be retrofitted into existing equipment replacing the current technology in ice machines with the inventive technology.

The second part of the invention of FIG. 21 consists of inventive ways to increase the ice harvest at each machine and decrease the water usage. This is particularly important to restaurants because space is so limited. If you can get a 500 pound ice machine to put out a 1000 pounds of ice in the same time as a current technology 1000 pound ice machine, that is something of high value. In addition, a current high quality ice machine throws away 50 percent of the water it uses to create ice, a most wasteful practice. For every ice harvest in 30 minutes, the system puts 2–4 gallons of water down the drain. Once you multiply water usage per 24 hour period, per ice machine running, a huge waste is had, not to mention the sewage treatment costs of all that water. The inventive designs and technology in FIG. 23 show how to build an ice machine to increase the ice production to its peak, as well as reduce water wastage to nothing up to a few ounces in the worst conditions.

Valve 412 is controlled by control 427 lets water into holding tank 407 and water release valve 408 that is also controlled by control 427, lets the water escape down the drain. The holding tank 407 is unique because of its shape, like a funnel or cone. It reduces scale buildup on the side walls and allows for quick exit of any water left in the system through valve 408. Probe 413 controls the water level. The water level probes 413 can be a simple float valve or the water working system discussed earlier. This controls the water level and the water level is set to the amount of water that will be turned into ice. If there is not enough water left in the system, the chiller plate 403 is full of ice. The pump 411 pulls the water out of the holding tank through pipe or hose 410 to the chiller plate where it distributes across the plate via distributor 434 and down the plate to the catch 435 and then back into the holding tank 407 via pipe or hose 406. TDS sensor 409 can be inserted into the pipe, holding tank or other appropriate location to detect if the water has been used up and how dirty or clean the water is. Support beam 400 holds weight sensors 401 and 402 that hold the chiller plate up. When the water has been used up, the system changes operation into defrost in order to remove ice from the plate. As the ice drops the chiller plate 403 gets lighter and eventually returns to the state of no ice. To speed up the process the system may also add some incoming water across the chiller plate. When all the ice drops into bin 405, the system determines if the remainder of water in the system needs to be drained or if it can continue. This determination is made by the tds level from sensor 409. Once a decision has been made and implemented, the system begins the cycle all over again with filling the holding tank 407 with fresh water.

With existing technology, an ice machine cycle time is run by using timers. They are set by the person installing the system, based upon assumptions on the time to form ice, etc. With current technology the system cannot optimize itself to hot, cold, or humid days. Many ice machine chillers are broken because the installer did not leave enough time in the cycle to drop all the ice, and it continued to build up on the chiller until the ice grew so large it broke the unit. Installers create long cycle delays to accommodate the worse case scenarios. This wastes system capacity. The times between harvest and creation create the long amounts of time it takes to make the ice. By using inventive sensors and designs in this inventive way the whole ice machine can optimize and diagnose itself to run at the fastest possible speed using the least amount of water. If something goes wrong, it announces the problem and takes proactive action to run at a minimum state. For example, if the defrost valve switch 420 is broken and stuck on freezing mode, the system can turn off the compressor 183 and run incoming water to drop the ice. This simple action is not possible with the existing technology.

Figure 24:
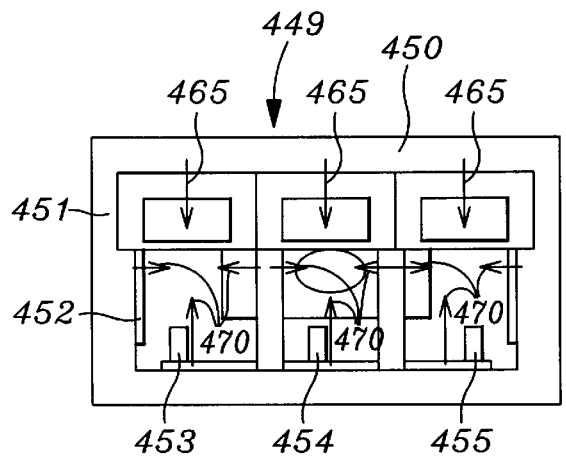
FIG. 24 is top schematic view of a hot or cold well design that will hold product temperatures at very level temperatures and comply with the new NSF requirements for cold product bins.
Figure 25:
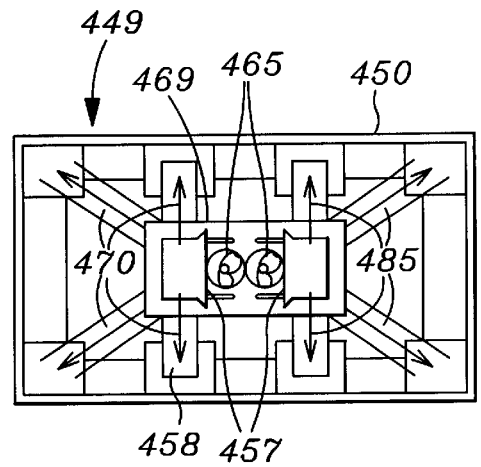
FIG. 25 is a bottom view of the hot or cold well design of FIG. 24.
Figure 26:
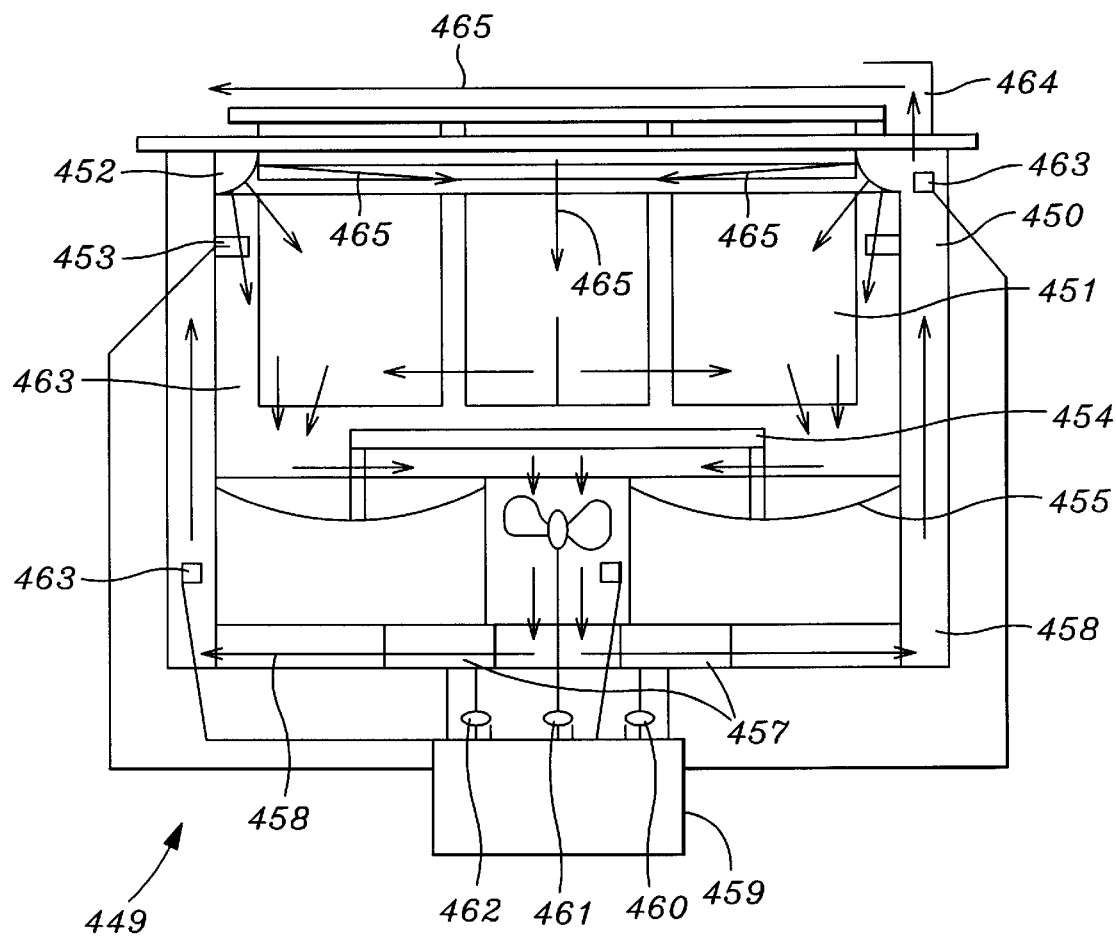
FIG. 26 is a side view of the hot or cold well design of FIGS. 24 & 25.

FIGS. 24–26 illustrate a spatial view of a hot or cold well design that will hold product temperatures at very level temperatures and comply with the new requirements for cold product bins. With current technology hot or cold wells are notorious for temperature fluctuations. If it is a hot system, they heat up the food to way over temperature and then turn off. Then the temperature drops far below the set point. These hot bins usually have the elements or heating system at the bottom of the unit; thereby, heating up the bottom to incredibly high temperatures so that if someone came into contact with them, injury would occur. This problem makes hot wells a liability issue for restaurants. The cold wells are similar. They either freeze the food product or keep it too hot. The existing cold wells require freon tubing to encircle the well which is very expensive. During cleaning, many times the unit is left on and the well is cleaned with warm water which over time will cause the freon tubes separate from the inside wall. This causes these systems to depreciate in performance. This is why NSF has changed its specification for these type of units.

FIGS. 24–28 illustrate inventive designs for thermal or hot and cold wells that takes issue with these problems and solves them. The system uses relay shaking, probe movement checking, probe feedback checking, disappearing equipment, air flow factoring, best verifiable logic, pulse cooling, pulse heating, AC energy sensor, cooling potential sensor, as well as the cooling system in FIG. 21. The hot or cold well is a design that can be used to heat or cool a product. They usually are built to be dedicated only to heating or cooling a product; however, there may be times where a switch could be used to tell the unit either to heat or cool.

A thermal or cold/hot well 449, includes a well 450 which supports pans or inserts 451 that hold the product at a particular temperature. These pans 451 can be the size of well, like a soup warmer, or multiple rows of pans that insert into the well like into a steam table. This inventive design does not put the elements or cooling system around the bin, but places them in a box underneath, next to, or around the location of the well. Also seen are vents 452, temperature sensors 453, drip cover 454, drip catch 455, fan 456, heating/cooling system 457, air duct 458, control 459, and AC current sensors 460, 461, 462, containment area 463, output 464, pan 465, air curtain 466, modular housing 469 and different air ducts 470.

Fan 456 pulls/pushes the air from the well through a heating or cooling system 457 and then into distribution tubes 485 that force the hot or cold air out the top via vents 452 that encircle the pans. These vents 452 blow the air straight against the pans 451 via arrows 466 which form air curtain 466. One unique feature about this system 449 is that when a pan 451 is removed the air flow from vents 452 form an air curtain to the next pan or wall. This allows the system to maintain its heating or cooling when a pan has been removed trapping the hot/cold air inside the well. With existing technology, as soon as the pan is removed, the hot air rapidly escapes or the cold air is forced down away from the product.

The top vents 452 push the majority of the air across the top to form an air curtain or hit the pans at the top. Some of the air flow is also directed downward as well. The air flow engulfs the pans with air at the determined temperature and changes the pan temperatures to an equivalent temperature. Then the air is pulled/pushed down under the drip cover 454 across the drip catch 455 and into the fan 456 and then cycled again. This system uses pulse heating or pulse cooling and air flow factoring to maintain the temperature levels to keep the pans at the exact temperature. The system uses moving air that constantly bombards the pans transferring the heat or cold into the pans steadily and equally throughout the containment area 463. The control 459 monitors and runs the system through temperature sensors 453, cooling potential sensors 463, and AC current sensors 461, 462, 460. The cold or hot well heat transfer system 457 represent the chiller coils from FIG. 21, and sensors 460–462 represent the sensors and controls from FIG. 21 to control the cold or hot well heat transfer system 457.

FIG. 26 also shows an air curtain above the pans 451 through output 464. This air curtain is used as a bug fan for outside areas in order to keep the bugs out of the product. On the cold well the above extra air curtain can also be used to drop the temperature of the top of the food an extra few degrees as well as to function as a bug fan for outside.

Figure 27:
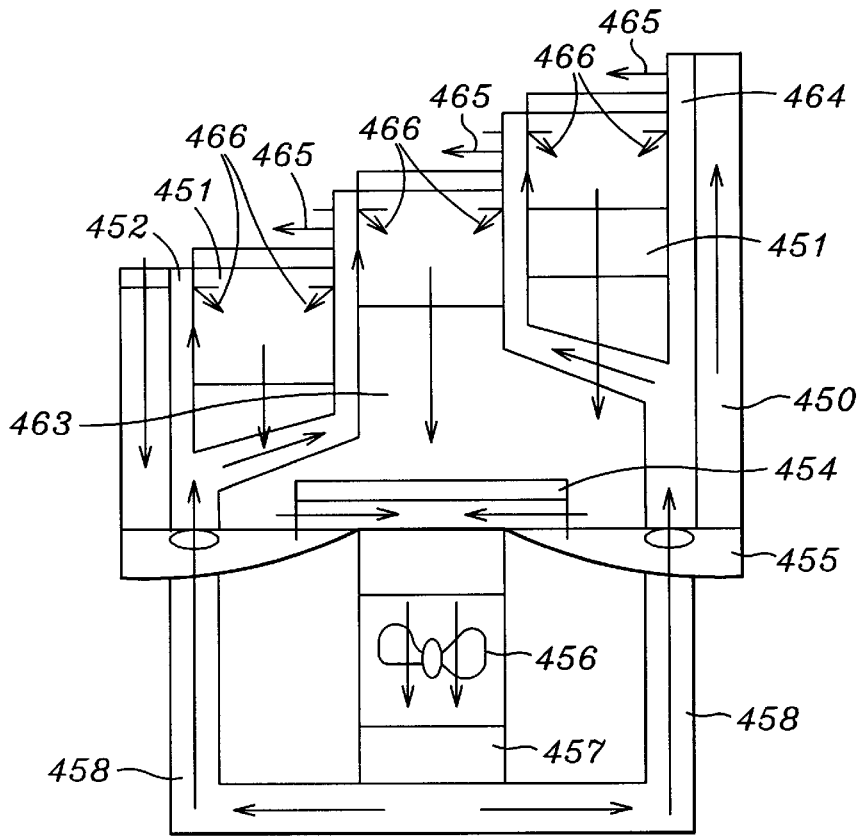
FIG. 27 is a side view of the hot or cold well design of FIGS. 24–26 and which uses tiered pan containers.
Figure 28:
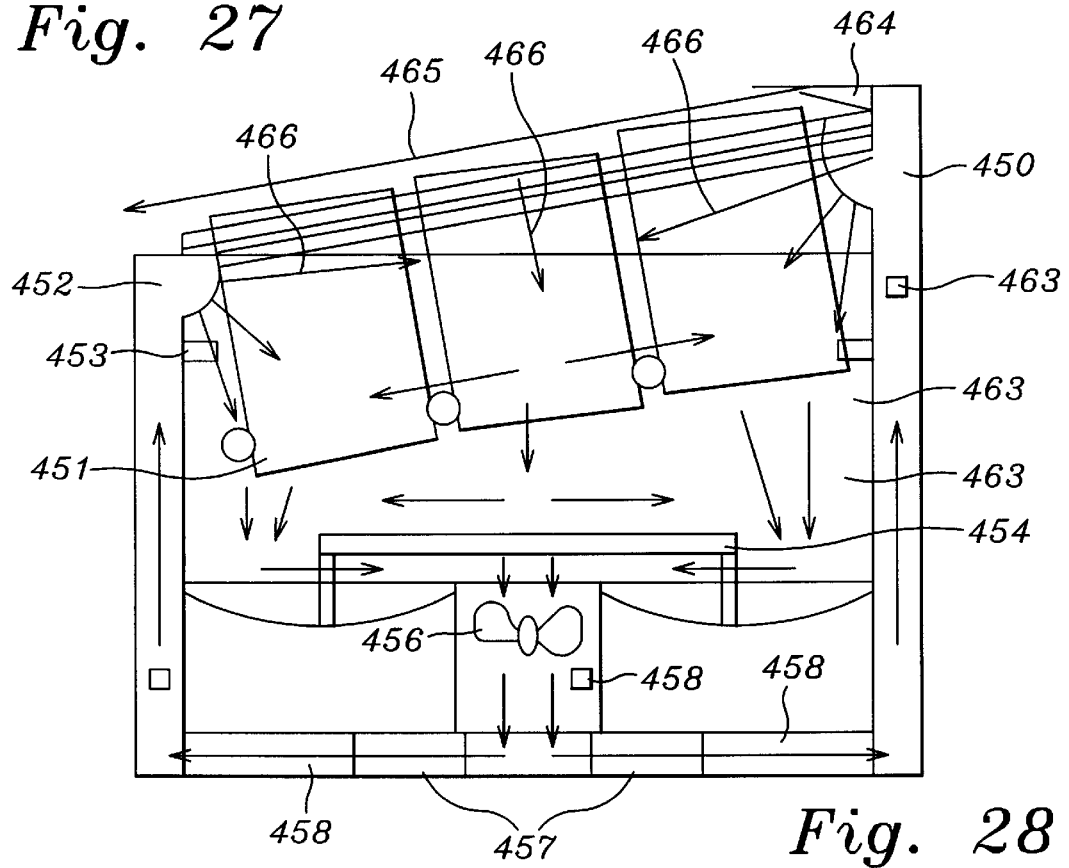
FIG. 28 is a side view of the hot or cold well design of FIGS. 24–26 and which uses tiered pan containers.
Figure 32:
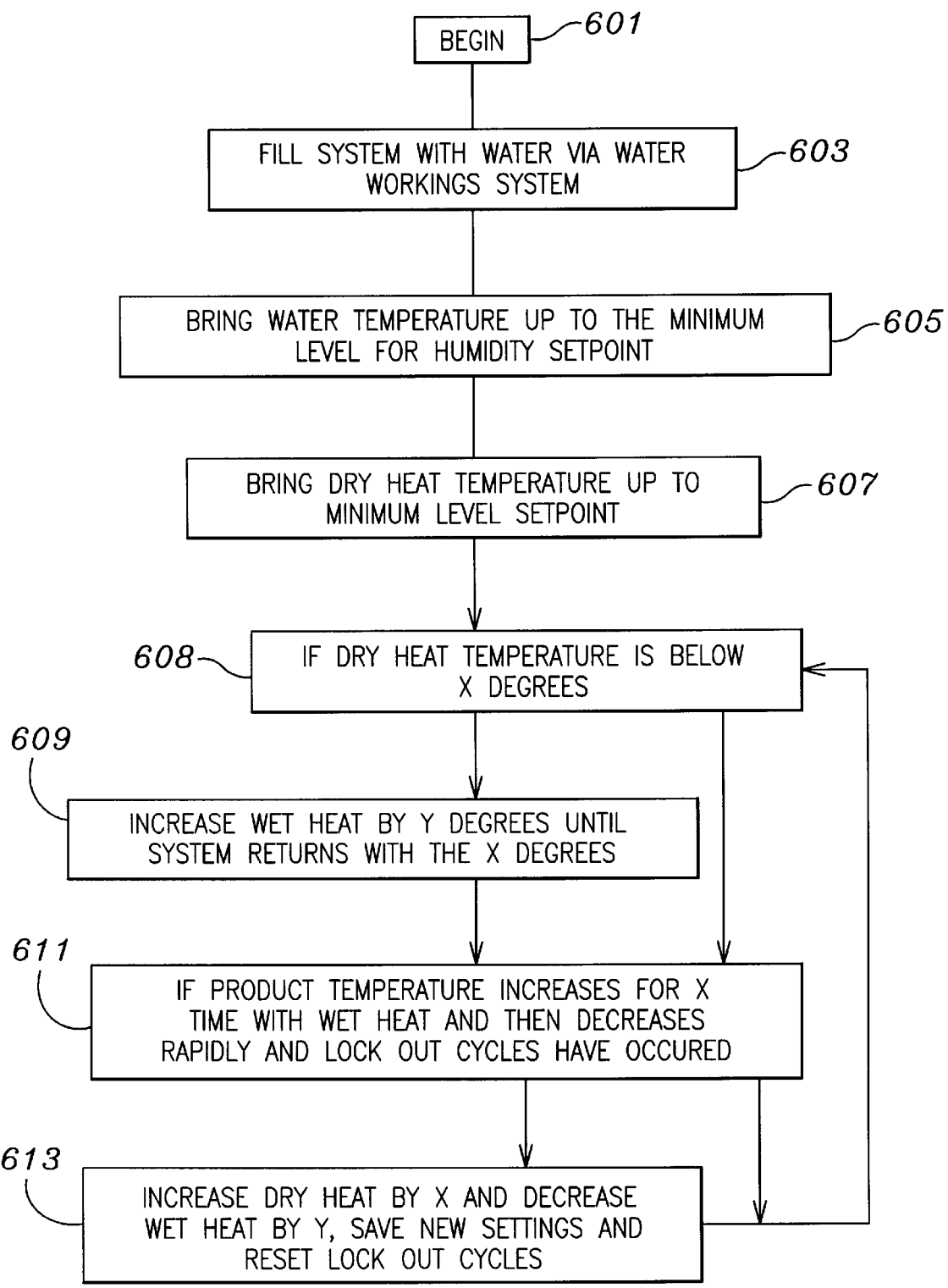
FIG. 32 is a process flow diagram for controlling the steam cabinet seen in FIGS. 29–31.

FIGS. 24–28 is divided into different types and views of the hot or cold well. FIG. 24 is a top view of a flat top unit. This view is useful to see how pan 451 are inserted into the top and to view how air curtain 466 for the pans seals off the unit. FIG. 25 is a bottom view of the well system 449. This view gives a clearer view of all the different air ducts 470 that go to the top of the unit to create the air curtain. It also shows the modular housing 469 that the heating or cooling system occupies including the fans that are separate from the well. The side view of FIG. 26 gives a clearer indication of how the air flows from top to bottom in the system and how deep the pans 451 are arranged. The side view of FIG. 27 illustrates a Side view of a 3-tier top version of a 3 tier hot/cold air well with pans. This view gives a clearer indication of the different type of air distribution system that is needed as compared to a flat top system as well as gives a good indication of how the air flows up and down through the system. FIG. 28 illustrates a side view of a sloped top hot/cold air well with pans 451 which are arranged in a sloping configuration. This view gives a clearer indication of the different type of air distribution system that is needed as compared to a flat top system as well as gives a good indication of how the air flows up and down through the system.

FIGS. 29–31 illustrate an inventive design for a door less steam cabinet 499. The door less steam cabinet uses relay shaking, probe movement checking, probe feedback checking, disappearing equipment, air flow factoring, best verifiable logic, pulse heating, water working system, best verifiable logic, AC energy sensor, and the cooling potential sensor. In FIGS. 29–31 structures which can be seen include fan 500, cabinet 501 water immersed heating elements 502, water status or workings system probe 505, 504, 503, and 506, wet heat temperature sensor 506, product temperature sensor 508, dry heat temperature sensor 509, dry heat elements 510, water inlet 511, central control 512, AC energy sensors 513, 514, 515, 517, 518 and 519, partition 520, water line 521, and inner space 523.

In the current door less steam cabinet 499 vents are located on the top of the unit and the heating elements 506 are operated at full capacity. The elements 502 in the water continuously boil and eject steam into the cabinet 501, and the steam is sucked up and out by the vent. This continuous movement of steam from the water up and out of the cabinet 501 creates constant hot humidity inside. The current door less cabinet suffers from element burnout because the heating elements are on all the time and dripping from the vent from condensed water, as well as pockets of less humidity in the cabinet because the vent may be pulling too much of the humidity out.

The inventive design of the cabinet 501 in FIG. 18 either has no vent or has the vent at the top of the unit closed off and balances out the humidity and heat inside the cabinet. The water submersed heating elements 502 momentarily steam into the cabinet space 523. Dry heat elements 510 put dry heat into the cabinet and dry out the top of the cabinet. Air curtain fan 500 pushes fresh air into the cabinet and causes the air flow to cycle in the cabinet and mix the dry hot air with the wet hot air. Half of the air produced from fan 500 goes into the cabinet 501, and the other half forms the air curtain. Temperature sensor 509 measures the dry heat temperature, temperature sensor 506 measures the wet heat temperature, and temperature sensor 508 measures the product temperature as well as how well the dry heat and wet heat are mixing together. The system is filled via water inlet 511, and the water workings system probes are 505, 504, 503, and 506. The water level in the cabinet for the bath is shown as line 521, and a cooling potential sensor 507 is used to measure the air flow of the air curtain fan.

FIG. 29 displays the cabinet 501 with a single entry point with a side view showing each of the pieces. FIG. 30 displays a frontal view of the cabinet 501 with the control 512 supported on the right side. Air is sucked in from the bottom into the unit, as the arrows indicate, and then blown out as an air curtain as the arrows indicate. FIG. 31 displays a dual entry unit 525 i which is almost identical to two door less steam cabinets 499 units back to back. What is noticeable about the unit 525 is that a single control 512 runs the unit and it shares the water workings system probes are 505, 504, 503, and 506, and water bath water line 521. Partition 520 extends down into the water to stop any air flow traveling in one side of the cabinet and out the other. The system is a bit narrower but independently balances out the humidity in each of the sides. The control 512 is shown in this figure attached to the control, and AC energy sensors 513, 514, 515, 517, 518, and 519 work with the best verifiable logic, relay shaking, probe feedback checking, and probe movement checking part of the control. The same control is used in the single cabinets except for the doubling up of certain sensors.

In order to calculate the humidity without a humidity sensor, the system uniquely uses the temperature probes and the reaction times of the wet and dry heat on each other. The basic formula for the system is:

$$\%humidity=((\text{Water Temperature}-100+(\text{Time Product Temperature is above Set point/Total of the Cycle}))/2$$

The door less steam cabinet 499 is able to self-adjust and does not have to be individually programmed. The central control 512 picks up outside humidity and barometric pressure in the time cycles combined with the affects that the water temperature and dry heat have on the product temperature. This system will keep the programmed humidity in the cabinet the same, even as weather patterns, seasons or the location of the system is moved from one geographic zone to the next.

FIG. 19 is a flow diagram describing how the inventive door less steam cabinet works without a vent. The logic begins with BEGIN block 601 and then flows to a FILL SYSTEM WITH WATER VIA WATER WORKINGS SYSTEM block 603 which commands the filling the system with water via the water. The logic then flows to a BRING WATER TEMPERATURE UP TO THE MINIMUM LEVEL FOR HUMIDITY SET POINT block 605, where the central control 512 brings the temperature up to the minimum level for humidity set point (for example 185 degrees). The logic then proceeds to a BRING DRY HEAT TEMPERATURE UP TO MINIMUM LEVEL SET POINT block 607 where the control 512 brings the dry heat temperature up to a minimum set point level (for example 130 degrees). The logic next flows to an IF DRY HEAT TEMPERATURE IS BELOW X DEGREES block 608 where the control 512 tests to see if the dry heat temperature drops a number of degrees below the set point X degrees, for example 10 degrees. If this has occurred, the logic flows to an INCREASE WET HEAT BY Y DEGREES UNTIL THE SYSTEM RETURNS WITH THE X DEGREES block 609. From either block 608 or 609, the logic continues to an IF PRODUCT TEMPERATURE INCREASES FOR Z TIME WITH WET HEAT AND THEN DECREASES RAPIDLY AND LOCK OUT CYCLES HAVE OCCURRED block 611. If the system will increase the wet heat by a corresponding temperature Y degrees, for example 7 degrees, until the system either achieves or returns to its proper set point, as specified in block 609. If the above statement is not correct, the system continues on to block 611. If the product temperature increases for Z (set able value) time with wet heat and then decreases rapidly and the lock out cycles have expired or occurred, the system logic will proceed to an INCREASE DRY HEAT BY X AND DECREASE WET HEAT BY Y, SAVE NEW SETTINGS AND RESET LOCK-OUT CYCLES block 613 where the control 512 will increase the dry heat by X (for example 10 degrees) and decrease the wet heat by Y (for example 10 degrees), save the new settings, and reset the lock out cycles so the system will not change the set point until the system has equalized. If block 611 is negative or block 613 has been reached, the program will loop back to block 608.

Figures 33, 34:
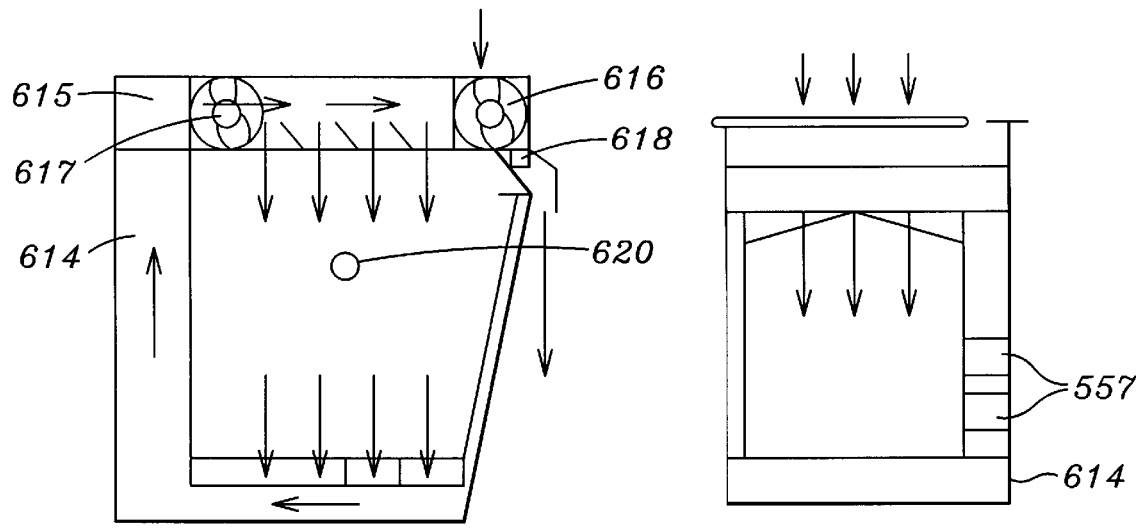
FIG. 33 is a side view of a design for a single door less refrigerator/freezer cabinet.
FIG. 34 is a front view of a design for the single door less refrigerator/freezer cabinet seen in FIG. 33.
Figure 35:
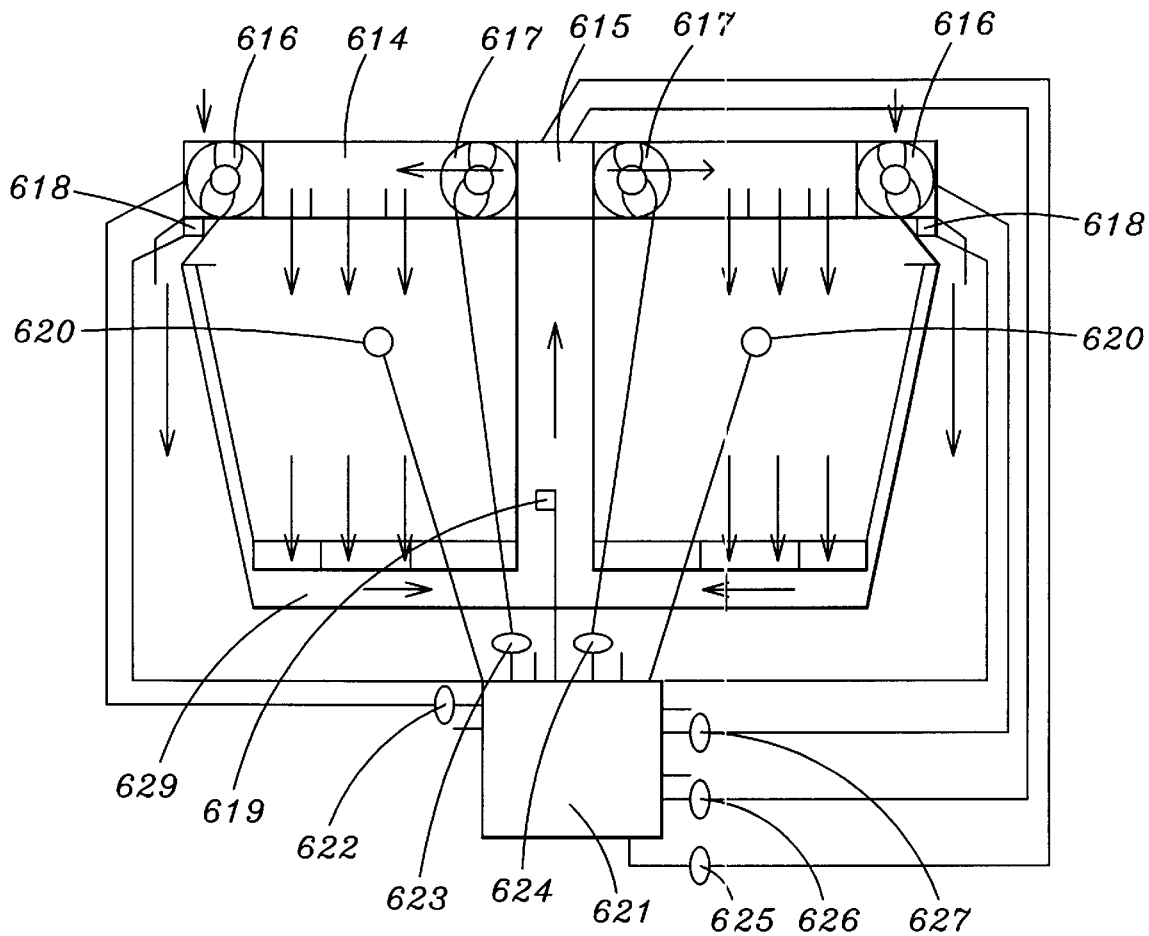
FIG. 35 is a side view of a design for a double door less refrigerator/freezer cabinet similar to those seen in FIGS. 33 & 34.

Referring to FIGS. 33–35, an inventive design for door less refrigeration/freezer cabinet 614 is shown as refrigerator cabinet 614 having a chiller 615, fan 616, fan 617, the cooling potential sensor 618 & 619, temperature probe 620, control 621 which is similar to system control 175 seen in FIG. 21, AC energy sensors 622, 623, 624, 625, 626, and 627.

The door less refrigeration/freezer cabinet 614 uses relay shaking, probe movement checking, probe feedback checking, disappearing equipment, air flow factoring, best verifiable logic, pulse cooling, best verifiable logic, AC energy sensor, air flow factoring, the cooling potential sensor, and the refrigeration/freezer system from FIG. 21. These inventive cabinets, such as cabinet 614 are useful by not having a door to open, they increase speed of service without the normal costs associated with an open unit. This ability to keep the cabinet 614 at a constant temperature and easy reach ability gives this unit an advantage over other systems as well as the control and diagnostic features discussed previously.

Specifically FIG. 33 shows a single version of the cabinet 614 where the chiller 615 for the freezer or refrigerator is controlled by the system in FIG. 21, or a local control 621. The fan 617 moves the chilled air towards the bottom of the unit across temperature probe 553 and when it gets to the bottom it moves back to the chiller 615 again. Fan 616 drives an air curtain to pull air from the outside and pushing it down across the cooling potential sensor 618 and then down the front of the unit as an air curtain.

FIG. 34 shows the front of the cabinet 614 and how the air curtain air flows and a mounting for the local control 621. FIG. 35 shows a two-ended refrigerator/freezer cabinet 629. Cabinet 629 is basically two single cabinets 614 back to back with a common chiller unit 615 which saves in cost. The system works the same as cabinet 614 of FIGS. 33 and 34 except for a common chase 630 down the middle. To demonstrate an example of how a control, such as control would be installed into the system, the control unit 557 is shown as configured to measure and control the cabinet 629 in the same manner in which it would control cabinet 614. AC energy sensors 622, 623, 624, 625, 626, and 627 are attached to the current using devices as well as temperature probes 620 and cooling potential sensors 618 and 619.

Figure 36:
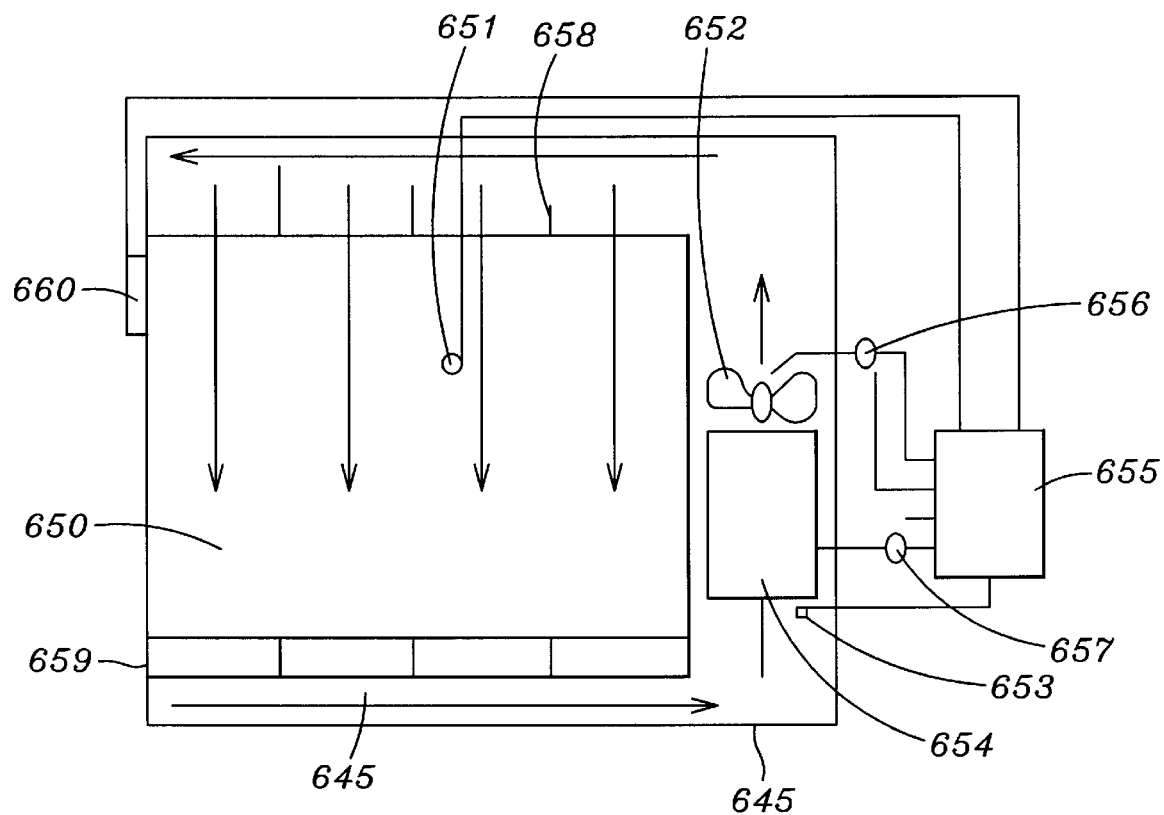
FIG. 36 is a side view of a design for a refrigerator/freezer cabinet utilizing a looped and dispersed air flow pattern.

FIG. 36 is a side view of an inventive design for a refrigerator/freezer/heated cabinet 645. The refrigerator/freezer/heated cabinet uses relay shaking, probe movement checking, probe feedback checking, disappearing equipment, air flow factoring, best verifiable logic, pulse heating, pulse cooling, best verifiable logic, AC energy sensor, cooling potential sensor and cooling system control from FIG. 21. In current refrigerator/freezer/heated cabinets, they do not use these inventive methods, control, airflow designs, and equipment designs.

In FIG. 36 can be seen refrigerator/freezer/heated cabinet 645, temperature sensor 651, fan 652, cooling potential sensor 653, chiller 654, control 655 AC energy sensors 656 & 657, and a door sensor 660.

On the cabinet 645 the air flow moves from top to bottom taking advantage of how cold air moves naturally in a downward fashion. If cabinet 645 were a heating cabinet, the air flow would move from bottom to top taking advantage of how hot air moves naturally in an upward fashion. The cabinet 645 in normal operation conducts its air flow in the inventive downward pattern. The cabinet uses temperature sensor 651 to evaluate its set point. It uses cooling potential sensor 653 to make sure there is air flow. It uses chiller 654 and sensors 657 and the cooling system from FIG. 21 and its features. It uses fan 653 to drive the air and AC energy sensor 656 to read the current of the fan. All the sensors and the cooling system from FIG. 36 is controlled by control 655. A door sensor 660 has been added to detect if the front door is open.

Figure 37:
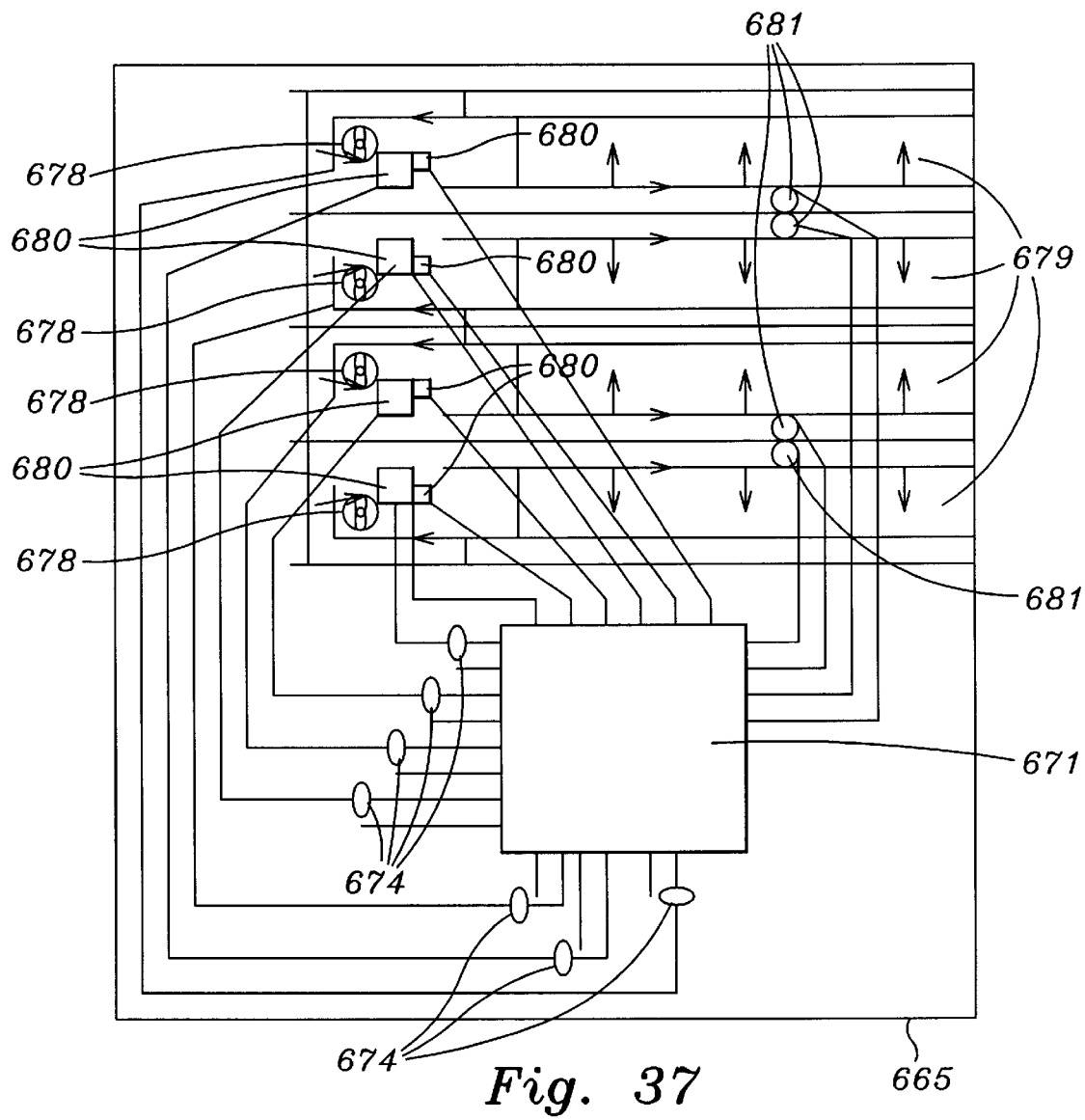
FIG. 37 is a spatial and control diagram for a hot and cold drawer.
Figure 38:
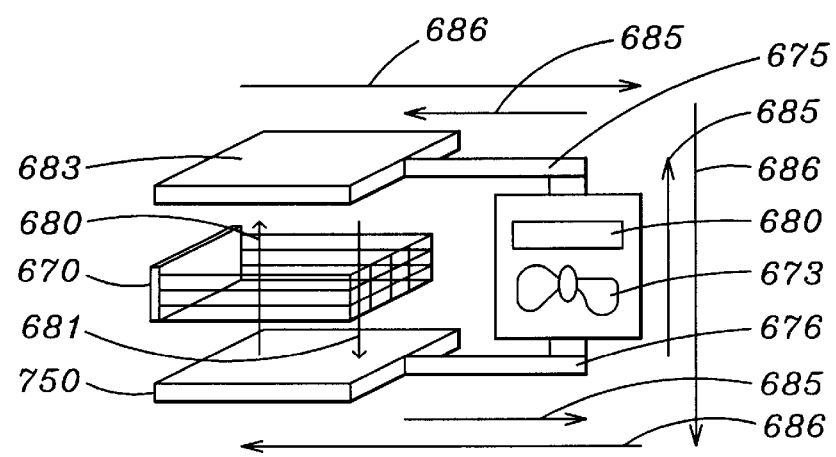
FIG. 38 is a schematic view illustrating individual air flow for the hot and cold drawer of FIG. 37.

FIGS. 37 & 38 illustrates a hot and cold drawer system for storing items at specific temperatures. It is similar to FIGS. 33–36 but is confined to a much smaller space of a drawer. The hot and cold drawer uses relay shaking, probe movement checking, probe feedback checking, disappearing equipment, air flow factoring, best verifiable logic, pulse heating, pulse cooling, best verifiable logic, AC energy sensor, cooling potential sensor and the cooling system control from FIG. 21. Each drawer can be individually temperature controlled or permanently made to heat or cool only. The system can be used to cook and hold baked potatoes, keep chicken, warm chips, chill cheese or freeze ice cream. The inventiveness of this design is that it is all located in a drawer that can easily be pulled out. It can also be used in operating rooms or commercial applications to sanitize equipment and products at a specified temperature. This design is truly unique and its ability to keep exact temperatures as well as the self-diagnostic capabilities and being able to program each drawer to a specified temperature.

Referring to FIG. 37, a schematic side view of a hot and cold drawer 665 illustrates an air conditioning system or enclosed area temperature system for storing items at specific temperatures or general use. This system is shown to demonstrate how the different methods will be installed into such a system. It doesn't matter if the system is a clean room, storage freezer/refrigerator, or air conditioning system the methods discussed can be shown to apply. This system uses relay shaking, probe movement checking, probe feedback checking, disappearing equipment, air flow factoring, best verifiable logic, pulse heating, pulse cooling, best verifiable logic, AC energy sensor, cooling potential sensor, and the cooling system control from FIG. 21.

FIG. 37 is a side view of the cold drawer 665 and which has regular pull out drawers. Drawers 678 are heated or cooled with the air flow moving upward in the control space. The air then moves to the fan 678 and then across the heater or chiller 672 and then across the cooling potential sensor 680 and then back into the control space. The air moves the reverse in the system when cooling and the fan 673 reverses and the air flow in the control space moves downward 679. Controller 671 controls the whole process with temperature sensors 681 and AC current sensors 674 and cooling potential sensors 680.

FIG. 38 is a detailed schematic spatial view of how the air flow moves across the drawers. A first hot air stream 685 moves in the system from the bottom distribution plate 677 upwards through the drawer 670 to the collection plate 683 down the vent 675 into heater exchange structure 672 and then into the fan 673 and out vent 676 and back into the distribution plate 677. The cold air moves in the opposite direction from the distribution plate 683, as an air stream 686 downward through the drawer 670 into the collection plate 677 into vent 676, across fan 673, across chiller 672 and out vent 675 and back into the distribution plate 683.

Figure 39:
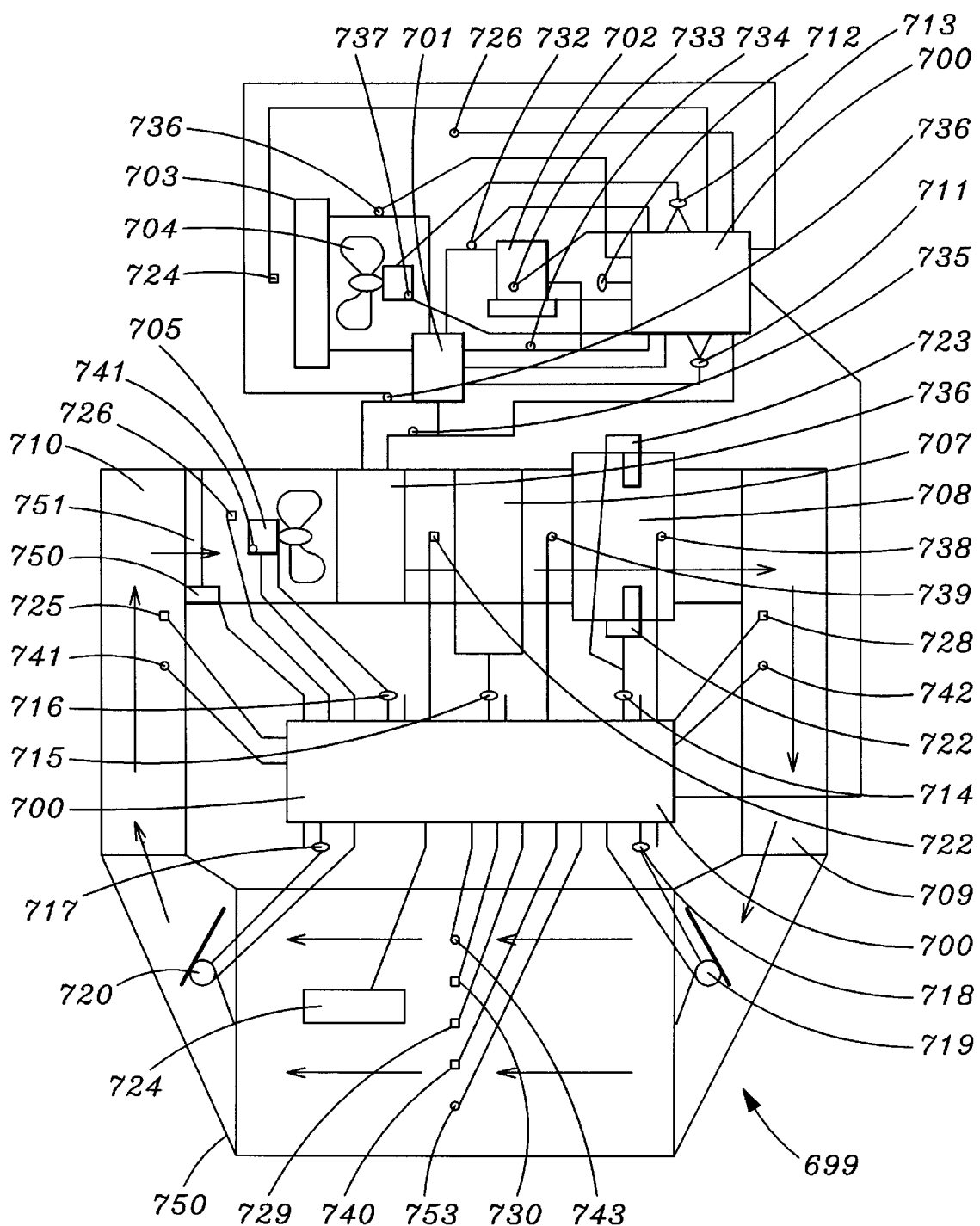
FIG. 39 illustrates a schematic diagram and control diagram of an air conditioning, central heating, and humidifying system.

FIG. 39 illustrates a schematic diagram and control diagram of an air conditioning, central heating, and humidifying system. The control 700 is broken up into two units because of the usual distances between the condenser 186 and chiller. Display 721 posts the temperature in the containment area 750 and allows setting of the different temperatures. The condenser is 703 with the condenser fan 704 is connected to the freon/coolant switch 701, which also connects to the compressor/pump 702 as well as the chiller 706. The chiller fan or circulation fan 705 blows the air through the chiller 706 and across the heater box 707 through the humidifiers/misters 708 into the ducting 709 that is guided into the room/containment area 750 with dampers 719 and 720 that guide the air flow either from top or bottom or into different parts of the room/containment area and then into the return air ducts 710 and through filter 751. In this example the dampers 720 and 719 guide the air flow into the upper or lower part of the room. This allows the cold air to be put into the top of the room which migrates downward and the hot air into the lower part of the room so that it migrates upwards.

Referring to FIG. 39, a schematic control diagram of an air conditioning, central heating, and humidifying system 699. System 699 uses the same basic ideas that are in FIG. 21 for cooling or freezing the air. In order to do this, it uses many of the same probe locations.

In FIG. 39 can be seen Control 700, temperature probe 705, heat box 707, humidifier box 708, temperature probes 711, 712, 713, 714, AC Current sensor 715, temperature probe 716, AC current sensors 717 & 718, Nozzles 722 and 723, cooling potential sensors 725, temperature probe 726, 727, cooling potential sensors 728, 729, 730, temperature probes 731, 732, 733, 734, 735, 736, 5 737, 739, cooling potential sensor 740, temperature probe 741, 742, 743, filter Sensor 750 for physically detecting if the filter is in place, and temperature probe 753.

This system 699 can also use all the probe locations that are in FIG. 21. Sensor 750 is a sensor that physically detects if the filter is in place. The control 700 logs when the filter has been replaced last. AC Current sensor 715 monitors the heat box 707 if it has been turned on. Nozzles 723 and 722 inject the system with moist water in the humidifier box 708 and AC sensor 714 monitors how much current they are using and 718 monitors the temperature drop. Cooling potential sensors 728, 730, 729, 740, and 725 that are seen the figure represent the different possible locations they can be installed that could assist in air flow information. Temperature sensors 742, 743, 753, and 741 can be located in these locations to assist in gathering useful temperature information. Sensors 717 and 718 represent encoders or AC current devices to analyze if the flaps are working properly. In total, this figure shows how to apply the inventive ideas in this patent to an air conditioning, heating, and humidifying unit and make it keep temperatures at unheard of accuracy, with diagnostic and recovery abilities never before achievable.

The controls 700 their topology and methods can be retrofitted into existing units in the field and other manufactured units and can provide the advantages of relay shaking, probe movement checking, disappearing equipment, water workings system, bets verifiable logic, probe feedback checking, pulse heating, pulse cooling, AC energy sensor, air flow factoring, and the cooling potential sensor.

The description and operation of the invention continues with PART 3. PART 3 is a inventive way of taking these controls and integrating them together to form a back nerve that can be accessed globally.

Conventional systems include a computer as the central computer that makes all the decisions. The central computer reads in the data from sensors or sub-panels and makes the correct calculations and outputs the results and actions when needed. Basically, the central computer is in control of the equipment, without it the system does not know anymore how to operate together. This problem poses many problems in critical operations where sensor/data lines can be cut or lose their connections and where the central brain can fail from a number of reasons causing catastrophic situations. To solve these issues a conventional system uses duplicate or backup systems. When the main brain fails, a backup comes on line or an alternate route is used if the connection fails. This can become expensive, buying a system twice, with incremental update routines between systems. This can become burdensome if both fail or there is a minor intermittent failure that causes the entire system to go off line.

As a solution to the conventional system is a back nerve system is utilizable where each individual unit or piece of equipment can function independently of the whole. Each individual system is connected to a group through a back nerve system where they have a forum to interact to each other or a group. Each individual control is a given the power to fully control itself and take action without a central computer. If the individual control can find a connection with other controls, it will optimize itself with group activities; otherwise, it will just optimize itself to its own environment. This creates the platform for a rugged control system where the conventional system would fail miserably. As well as single points of failure, conventional systems lack individual optimization and focus. They seem so burdened with monitoring things that are running and when to turn things off or on, that they do not see the whole environment. Since a back nerve system works individually, it can not only turn things on and off, but it can analyze the health of the equipment and when things fail, it use other components to temporarily make up for the failure. Since the back nerve system optimizes at the individual level, many new and inventive ideas have been created for optimization at that level for the various types of equipment the controls are placed into. The inventive methods of individual controls and sensor methods are relay shaking, probe movement checking, water working system, best verifiable logic, probe feedback check, pulse heating, pulse cooling, and air flow factoring. These are inventive ways the individual control works with the back nerve environment. With the back nerve the system true value begins with individual inventive sensor controls and methods in the local area of a machine which then influences groups of machines and how they interact. Then if a central computer is added, it only needs to do a few tasks to optimize the whole network and what level of optimization it wants. The central brain communicates this with the back nerve and the back nerve with will take the steps to get there. This is exactly the opposite of conventional thought of one system influencing and controlling all the subsystems directly.

The basic back nerve is a connection grid between individual equipment controls. This back nerve grid connection allows each control to send information that is stored in a common memory pool for all the controls to look at when needed. Sample data of the information would be priority levels and operational levels of different controllers. This information is used by the other controls so that they will self-optimize themselves to the group or information that is stored. This allows for the groups of equipment to run a disappearing equipment routine without a central brain. As well as holding this small general library of operating information for all the equipment to see, is a general timer that can be programmed for when certain pieces of equipment are scheduled to be turned on/off and an emergency disconnect to the breaker or main power line to shut off power or other feeds to an individual piece equipment to shut it down in case of emergency. Flashing lights and a voice/buzzer, can be added to indicate a critical or non-critical incident has occurred as well as a display indicating where the problem is. To activate these devices the unit would monitor the small information library for critical or non-critical errors that the controls are sending in and activate accordingly. The back nerve can then be dialed into by or connected to an external computer, to a web server, send E-mail, or dial out to page an individual. These external sources can then reprogram the individual controls or back nerve, monitor, or test the system. If the back nerve goes off-line, each individual piece of equipment will work by itself.

To reduce energy costs can be accomplished via the back nerve by having one control talking with another or reading data from the library and optimizing though different routines (for example fuzzy logic, numeric logic, or linear equations) as to when it can turn on its different elements or functions. These logic routines are downloaded into the back nerve, which in turn changes the runtime logic library in each control to the new routine.

The inventive idea of taking the above example and linking it to a group of equipment together over a back nerve and letting each control calculate its own running in the back nerve. Together these controls manage all the current using devices, and as a group optimize themselves to reduce energy costs. This can be done with air conditioning, heating, cooking, freezers and others all hooked together to produce the minimal spike available. If connected nation wide at numerous sites, it could greatly reduce the energy costs needed to cover the spikes and dramatically reduce the amounts of fuel used to produce the energy at those levels. This technology can be placed into more locations because of its low cost versus the conventional as well as can micro manage the equipment faster and better.

The back nerve has the ability to transfer information from machine to human at low cost which means its use will be far greater and widespread than the conventional technology. It can save lives by transmitting critical failures through the back nerve to the employees that temperatures are below dangerous levels and not to serve food. But more important is that it can also inform that the main element has failed, your temperatures will drop in 20 minutes to dangerous levels, creates time to inform the boss, call repair crews, or take alternative measures. It can apply to food products or dangerous gasses in industrial environments. This simple feature can save lives and property and its widespread use can create savings and up productivity not seen before.

The individual controllers have sensors that connect to each important part of a machine as well as the on/off switches to the different parts. That is not unique, but what the control does with that is unique and how it works with the back nerve is unique. Each of the controllers have a little bit of the smarts versus conventional systems in concentration into a single point. Interplay is an algorithm that runs inside the control that communicates with the back nerve. It sends the library its name, group, rank, its important usage parts with their priority levels, if it is in warm-up, if it has critical/non-critical problems, what is on and what is off, and what it is planning to turn on and off in the next few cycles. Each control in a group optimizes itself to the higher rank units and lower numbers at the same rank. When a higher rank energy device is active, a lower rank device turns off. There is a delay of a few cycles when the actual units turn on as to when they say they are on, giving others a chance to turn off. The controllers send each other this information across the back nerve links and constantly update their library. The back nerve can change their name group and rank to optimize the entire system via the routine that the main brain downloads to it. If the control cannot function within the limits given it, it will operate independently until it finds an optimization slot. This is a condition where the back nerve will move a piece of equipment that cannot optimize in a particular slot and give it a new name, group, or rank. This interplay between controls of equipment can optimize energy usage, hot water, or other limited resources. The central brain can also call upon the single control through the back nerve and reprogram or update its running software.

Figure 40:
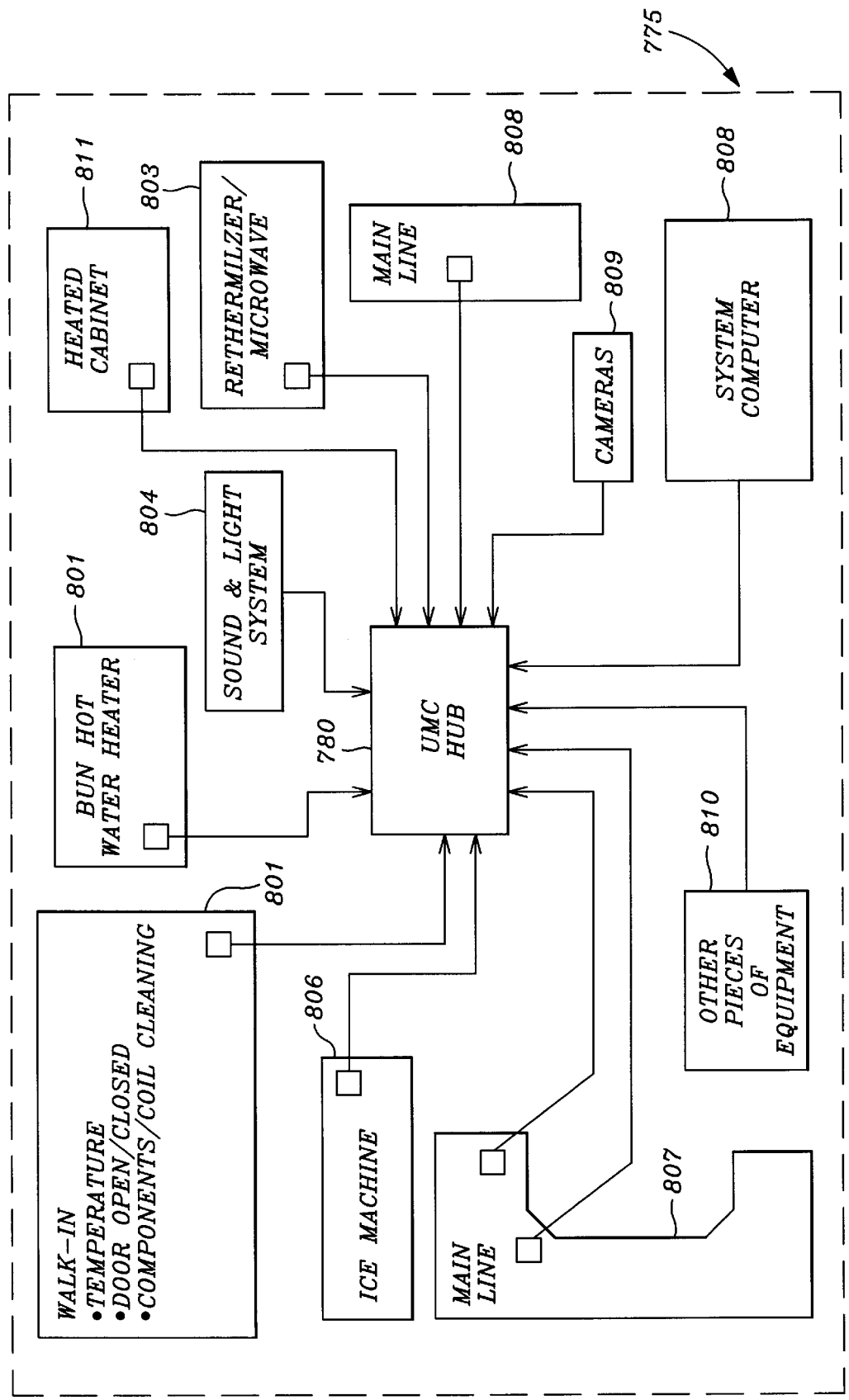
FIG. 40 is an overall schematic diagram of a location or facility site such as a restaurant kitchen or other food production facility.

Referring to FIG. 40, an overall schematic diagram of a location or facility 775 is a site such as a restaurant kitchen or other food production facility. FIG. 40 shows a view of how back nerve connections are made in a star type format, where all the pieces of equipment directly link to a central hub 780. The system can also be linked in different formats that have different advantages and disadvantages, for example a loop from one piece of equipment to another until the entire connection forms a massive loop. In this figure each of the different pieces of equipment are connected with each other through hub 780. In many kitchens you have the following pieces of equipment: walk in freezer 801, heated cabinet 802, re-thermalizer 803, sound and light system 804, hot water heater 805, ice machine 806, main cooking line 807, backup cooking line 808, cameras 809, and any other piece of equipment not mentioned generally designated with the numeral 810. A control discussed earlier with a back nerve connection is installed to run in each one of these pieces of equipment. The sound and light system 804 has also been added for critical problems. The hub 780 is then connected to a main computer 811 located off site or on site 775. This connection can be to the back of the office or to a computer thousands of miles away. The connections can be across the internet, phone lines, or any other communication medium necessary. To this one computer 811, thousands, hundreds, or one of location can be connected. The machine identity, rank, group, day plan, week plan, year plan, and optimization method choice are all downloaded from this main brain into the back nerve.

Figure 41:
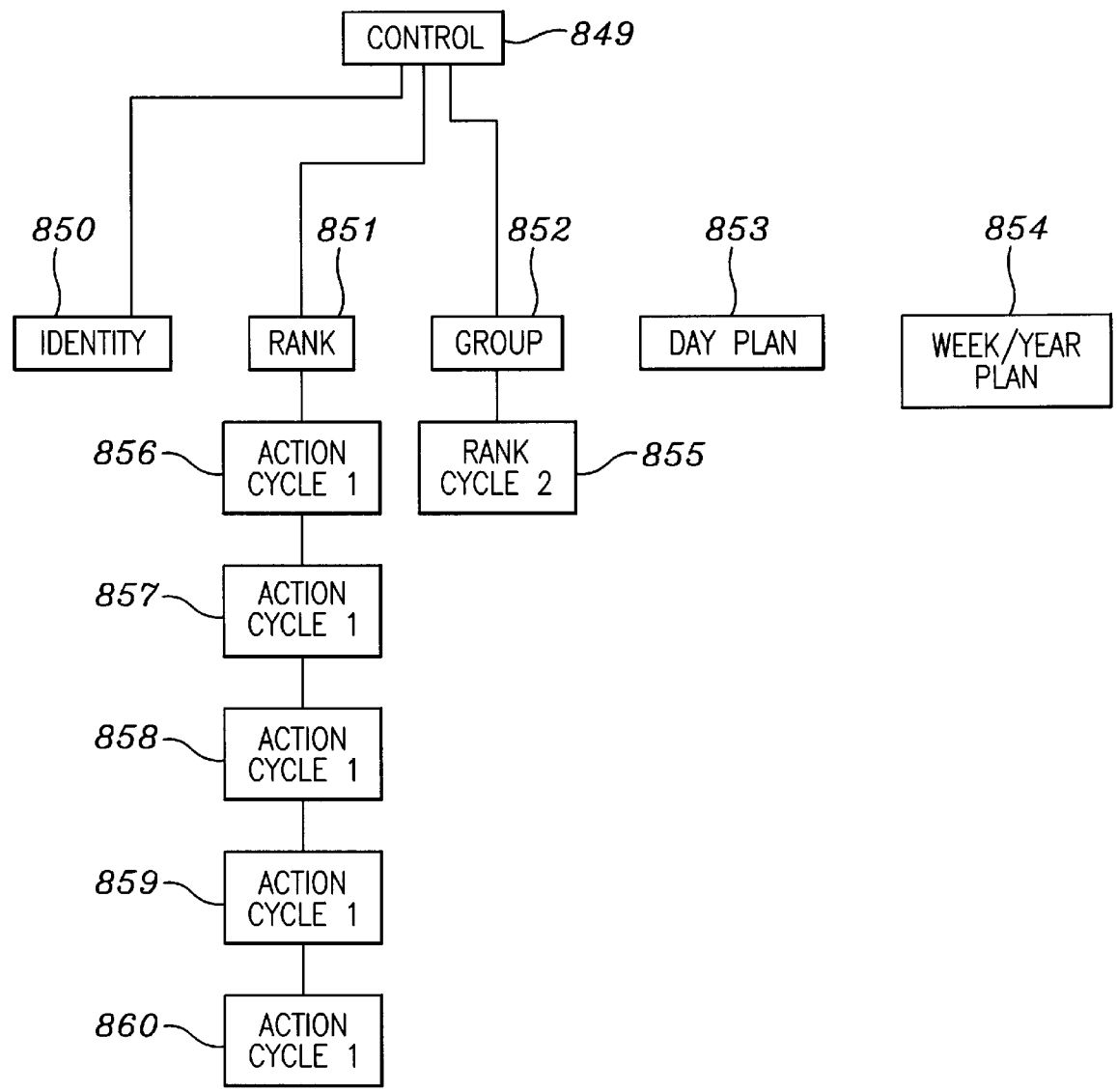
FIG. 41 is a process flow and relationship diagram of one possible configuration of the back nerve data stream designatable by each general control shown in the Figures describing the invention.

Referring to FIG. 41, a diagram of one possible configuration of the back nerve data stream that is on each general control designated by the CONTROL block 849. Block 849 interconnects logically with a number of other blocks including IDENTITY block 850, RANK block 851, GROUP block 852, DAY PLAN block 853 and WEEK/YEAR PLAN block 854.

Beneath the GROUP block 852 is located a RANK CYCLE 1 block 855. Beneath the RANK block 851 are located a vertical series of blocks including ACTION CYCLE 1 block 856, ACTION CYCLE 2 block 857, ACTION CYCLE 3 block 858, ACTION CYCLE 4 block 859, and ACTION CYCLE 5 block 860.

Each control 849 has an IDENTITY 850 which includes serial number, installation date, manufacturer, and network ID number. Then each control 849 has a RANK 851 variable that signifies its level of influence on other pieces of equipment. With each RANK 851 it gets an action cycle. If there are five pieces of equipment within a group, there will be five action cycles. Each action cycle is a word or words of 0 and 1's depicting the different elements in the five different machines. With the logic algorithm (fuzzy logic, additive logic, linear programming) each controller figures out its optimal on (1 state) and off (0 state) states and posts them to all the controllers. So each control 849 has an optimized copy of th e following five action cycles, seen in blocks 856–860. If a control 849 does not have a space to optimize in the rank, it will bump itself off the GROUP 852, proceed to operate on its own, and tell the hub 780 that it needs to be put into another GROUP 852 that it can work with. The GROUP 852 is a calculated five (or however big the rank is) rank cycles to determine if more equipment can be fit in. If more equipment can be added, the hub 780 will assign more equipment to a particular group to be more efficient. The hub 780 tries to optimize by fitting as many pieces of equipment into a group as possible. If one piece of equipment is turned off, the hub 780 will automatically assign more pieces of equipment a higher RANK 851 in the GROUP 852 taking from other groups to eventually reduce their number. If the hub 780 dies, the individual controls will maintain their groups, and some may attempt to interrupt away for a while until they can fit in again or the hub 780 recognizes them and can place them in new groups. The controls for the more critical operation will have a higher action cycle, and this gives them their priority and can bump other less critical pieces from the group. The DAY PLAN 853 and the WEEK/YEAR PLAN 854 is downloaded from the main computer 811 or is input into the hub 780. The hub 780 from a running history or a logic routine changes the groups and ranks of controls as it begins, runs, and ends the day according to the preset schedule. This is also done for week and yearly schedules.

The sensors, controls, back nerve, and the PC (or remote brain) and their connections seen in FIGS. 1–41 are in total referred to as the Zero Defect Management system. This system has equipment analysis. From the equipment back nerve the main computer gets make and model of the equipment, serial numbers, installation dates, list of parts that are malfunctioning, severity of the service needed (emergency or non-emergency), how much time before items cannot be served or they need to be thrown away, and store location. From the information it gets the computer can track maintenance issues, store by store, district by district, and formulate on average the costs of repairs. From the information the computer can generate forms on how to fix the equipment and what parts to bring, and how to get at the part. This allows the company to place time limits on the repair and dollar limits on costs. This zero defect management system with computer and back nerve becomes an automated response system never seen before in the industry. It enables corporate headquarters to make studies on their stores. The system gives management the following: how often a piece of equipment is used, where pieces of equipment are being moved to or tracks them, flag interesting errors and service costs that are too high, calculate the mean time before failure, analysis if equipment failure is due to employee training, maintenance, installation, design, and how the environment affects the equipment or service issues. Never before has this type of information been available at the touch of finger from miles away. This dramatically reduces travel costs, checkup costs, and labor costs. This is what makes the zero defect management possible. The system can be so automated that it will give reports via E-mail.

This zero defect management does a cleaning check with a single service option. Many of the service costs are due to neglect or lack of cleaning. This system will send an automated response to the store, via a display, E-mail, or other attention form, that tells exactly what management needs to do to remedy the situation. By this equipment self analyzing itself, it can save the store incredible service costs. Management will also know what part service should bring if a part fails. This gives management the knowledge to tell service to bring a particular part with them, so that management will not have to pay for two trips or two service calls and the extra down time to get the part. By giving management the information about their equipment, the less they are vulnerable to fix it schemes. With existing technology this problem is out of control. Zero defect management system gives the control back into the hands of management.

The zero defect system has service integration to enable service to schedule their routes. The system can assign a route that is dependent on the persons skills and pay, the parts that are in stock, the priority, and the times they can gain access. It also will give service the ability to look at the equipment remotely through the phone line or other communication link. This brings the service costs down to a minimum and allows service to look at the equipment if they want to verify things.

The zero defect system uses online equipment tracking. This system keeps an inventory of where all the pieces of equipment are in the network and attaches its service records to it. This way when you pull up the equipment in a particular store you get all the work that has ever been done to it. If for some reason this equipment moves to another location on the network or just disappears, it will be picked up immediately and those responsible can be notified.

The zero defect system uses on line diagnostics. Online diagnostics checks to see if equipment have been repaired properly for what was paid. It is also a way for corporate to look in on situations from time to time to evaluate them. It also allows service companies to look at the equipment before they come to fix it and to verify that it has not already been fixed by someone else.

The zero defect system has quality assurance triggering. This system checks to see that none of the equipment is having critical errors or temperature problems that could be dangerous to store operation. If such a circumstance occurs, the system will notify quality assurance and may choose other options like paging the manager of that particular site. This way quality assurance has a forewarning of the problem before it happens and can work with the individual locations to insure that the situation is dealt with properly.

Inventive sensors and methods, inventive designs and controls, inventive global and local connections, service integration, cleaning check w/single service option, online equipment tracking, on line diagnostic, quality assurance triggering are all what makes zero defect management possible.

While the present invention has been described in terms of a control system for a food service establishment and is particularly useful in controlling a steam table, one skilled in the art will realize that the structure and techniques of the present invention can be applied to many similar appliances. The present invention may be applied in any situation where multi level and multi-task control is to be achieved with a wide variety of differing control inputs and outputs.

Although the invention has been derived with reference to particular illustrative embodiments thereof, many changes and modifications of the invention may become apparent to those skilled in the art without departing from the spirit and scope of the invention. Therefore, included within the patent warranted hereon are all such changes and modifications as may reasonably and properly be included within the scope of this contribution to the art.

What is claimed:

1. A system for controlling a food preparation area comprising:
   a universal multi-tasking controller having a plurality of control ports, a plurality of controller current monitor inputs, a plurality of temperature monitor inputs, and a communication port for communicating with a system computer;

a plurality of electrically driven devices, each having a control connected to one of said of plurality of control ports of said controller, a temperature monitor, connected to one of said plurality of temperature monitor inputs of said controller, and a current monitor, connected to one of said plurality of temperature monitor inputs of said controller, and wherein said universal multi-tasking controller is programmable by said system computer to control said plurality of electrically driven devices to level, control and coordinate the consumption of electrical power to reduce peak demand.

2. The system for controlling a food preparation as recited in claim 1 wherein said plurality of electrically driven devices, includes both heated and chilled electrically driven devices.

3. The system for controlling a food preparation as recited in claim 1 wherein said temperature monitor is at least a cooling potential sensor.

4. The system for controlling a food preparation as recited in claim 3 wherein said multi-tasking controller is programmed to compare a first output of said temperature monitor to a second output of said one of said current monitor to determine the effectiveness of a given one of said plurality of said electrically driven devices.

5. The system for controlling a food preparation as recited in claim 1 wherein said multi-tasking controller is programmed to assign each of said electrically driven devices to a rank, which signifies its level of influence on other electrically driven devices, and to execute a distributed control action cycle for each of said electrically driven devices based upon said rank.

6. The system for controlling a food preparation as recited in claim 1 wherein said multi-tasking controller is programmed, with respect to each of said plurality of electrically driven devices, to compare a magnitude of signal of said temperature monitor with a magnitude of signal of said current monitor at a set of control parameters to determine a level of effectiveness of at least one of said plurality of said electrically driven devices.

7. The system for controlling a food preparation as recited in claim 6 wherein said multi-tasking controller is programmed, to associate said magnitude of signal of said temperature monitor with a magnitude of signal of said current monitor at a set of control parameters to determine a level of effectiveness of at least one of said plurality of said electrically driven devices.

8. The system for controlling a food preparation as recited in claim 1 and wherein one of said plurality of electrically driven devices includes a steam table system further comprising:

a water holding tank having at least one vertically extending wall, and an inlet, and for holding a volume of water having a water level;

a first level probe, supported by said wall, for detecting the presence of said water level in said holding tank;

a second level probe, vertically lower than said first level probe for detecting said water level at or below said second probe;

a controlled valve in communication with said inlet of said tank;

a temperature probe supported by said wall and electrically connected with said control; and a heating element within said tank and mounted to be positioned within said volume of water and electrically connectable controlled by said control;

said control electrically connected to said first level probe, said second level probe and said controlled valve and set to open to maintain said water level at said first level probe and to fully open if said water level drops below said second level probe; and wherein said temperature monitor is said temperature probe, and wherein said current monitor is configured to monitor current into said heating element.

9. The system for controlling a steam table as recited in claim 8 wherein said first and said second probes are total dissolved solids probes.

10. The system for controlling a steam table as recited in claim 8 wherein said control is set to control said valve based upon an indication by said temperature probe that one of said first and second level probes has malfunctioned.

11. The system for controlling a steam table as recited in claim 10 wherein said control is set to control said valve based upon at least one of a waterstatus and an errorstatus scalar sums.

12. The system for controlling a steam table as recited in claim 10 and wherein said control is set to control said heating element by pulse heating based upon an indication by said temperature probe.

13. The system for controlling a steam table as recited in claim 9 wherein said temperature probe is a first level probe, and at least a first total dissolved solid probe mounted above said first temperature probe, both said first temperature probe and said first total dissolved solid probe electrically connected to said control and wherein said control is set to control said valve to control said water level based upon a temperature difference and a total dissolved solids reading of water detected by said first temperature probe and said first total dissolved solid probe.

14. The system for controlling a steam table as recited in claim 9 and further comprising a temperature probe electrically connected with said control, and wherein said control is set to compare an indication from said first and second total dissolved solids probes with a temperature adjustment detected by said first and said second total dissolved solids probes and said temperature probe to determine if at least one of said first and said second total dissolved solids probes is in a condition of at least one of malfunctioning, dirty, and no water present.

15. The system for controlling a steam table as recited in claim 10 and further comprising an overflow probe supported by said wall and electrically connected to said control and wherein said control is set to shut said valve when said water level is detected by said overflow probe.

16. The system for controlling a steam table as recited in claim 10 and further comprising an alternating current energy sensor in proximity to receive an electromagnetic field from an electrical supply line powering said heating element and having a current sensing output electrically connected to said control; and wherein said control is set to control and check the operation of said heating element based at least in part upon said current sensing output.

17. The system for controlling a steam table as recited in claim 16 wherein said alternating current energy sensor further comprises a spool having a hollow cylindrical core having a first end having a first projection and a second end having a second end having a second projection; a clasp extending from at least one of said first and said second projection for enabling a current carrying conductor to be wrapped about said cylindrical core and held in place by said clasp.

18. The system for controlling a food preparation as recited in claim 11 wherein one of said plurality of temperature monitor inputs is a thermal potential sensor comprising:

a housing for mounting in an air flow stream;

an internal temperature probe mounted within said housing and isolated from flowing contact with said air flow stream;

a heat source, located within said housing, for heating an area surrounding said internal temperature probe;

an outside temperature probe mounted outside of said housing and in flowing contact with said air flow stream; and a control connected to said inside temperature probe and said outside temperature probe for computing a temperature difference to detect temperature changes in said air flow stream.

19. The thermal potential sensor as recited in claim 18 wherein said heat source is a voltage regulator.

20. The thermal potential sensor as recited in claim 18 wherein said control is programmed to use cooling times to determine air flow and readings over time to determine if said thermal potential sensor is fouled.

21. The system for controlling a food preparation as recited in claim 11 and wherein one of said plurality of electrically driven devices includes an ice machine system comprising:

a weight sensing support;

a chiller plate, having an inlet and an outlet for passing refrigerant, attached to said weight sensing support, for providing a surface for forming ice;

a chiller temperature sensor supported by said chiller plate;

a water inlet conduit for introducing water onto said chiller plate;

a total dissolved solids sensor in communication with said inlet conduit for sensing the purity of water used for making ice;

a refrigerant system having an air cooled condenser having an air path across said condenser, having an inlet and an outlet connected to said inlet of said chiller plate, a compressor having an inlet connected to said outlet of said chiller plate and an outlet connected to said inlet of said chiller plate, and carrying a refrigerant in said refrigerant system;

a condenser supply refrigerant temperature sensor in communication with refrigerant flowing toward said condenser;

a cooling potential probe located within said air path and downstream of said condenser; and said control connected to said cooling potential probe, said chiller temperature sensor and said condenser supply refrigerant temperature sensor for monitoring and controlling said ice machine system, and wherein said temperature monitor is said chiller temperature sensor, and wherein said current monitor is configured to monitor current into said refrigerant system.

22. The ice machine system as recited in claim 21 wherein said control monitors and controls said ice machine system using at least one of relay shaking, probe movement checking, probe feedback checking, disappearing equipment, water working system, air flow factoring, best verifiable logic, pulse cooling, AC energy sensor analysis, and cooling potential sensor analysis.

23. The ice machine system as recited in claim 21 and further comprising a total dissolved solids sensor in communication with said water inlet conduit for detecting the presence and quality of water introduced onto said chiller plate.

24. The ice machine system as recited in claim 21 and further comprising a cone shaped holding tank for holding re-distribution water to be distributed over said chiller plate continually to cause said water to freeze onto said chiller plate.

25. The system for controlling a food preparation as recited in claim 11 and wherein one of said plurality of electrically driven devices includes a thermal well comprising:

a well structure having an internal space for supporting at least one of pans, drawers and inserts;

electrically powered means for keeping the inside of said well structure at a predetermined temperature;

a current sensor associated with said electrically powered means for sensing at least a magnitude of electrical power consumed by said electrically powered means;

temperature sensors in thermal communication with said internal space; and a control having a first plurality of inputs, each input associated with and connected to a single one of said temperature sensors, and at least a second input connected to said current sensor, at least a first output connected to said electrically powered means, said control for controlling and monitoring an efficiency status of said well structure using at least one of relay shaking, probe movement checking, probe feedback checking, disappearing equipment, water working system, air flow factoring, best verifiable logic, pulse cooling, AC energy sensor analysis, and cooling potential sensor analysis; and wherein said temperature monitor is at least one of said temperature sensors, and wherein said current monitor is said current sensor.

26. The thermal well as recited in claim 25 and further comprising:

an air flow in system, in which thermally treated air is taken in from a bottom area of the well structure, and then thrust against the sides of said at least one of pans, drawers and inserts such that removal of said at least one of pans, drawers and inserts permits the formation of an air curtain for reducing the transfer of thermal energy into and out of said thermal structure to thereby help keep the inside of said well structure at said predetermined temperature.

27. The thermal well as recited in claim 25 and further comprising vents, supported by said well structure for communication of said internal space with the atmosphere.

28. The system for controlling a food preparation as recited in claim 11 and wherein one of said plurality of electrically driven devices includes a thermal cabinet comprising:

a cabinet structure having an internal space for supporting at least one of pans, drawers and inserts;

a dry thermal unit located at an upper end of said cabinet structure; and a wetted thermal unit located at a lower end of said cabinet structure;

a current sensor associated with said electrically powered means for sensing at least a magnitude of electrical power consumed by said electrically powered means;

temperature sensors in thermal communication with said internal space; and a control having a first plurality of inputs, each input associated with and connected to a single one of said temperature sensors, and at least a second input connected to said current sensor, at least a first output connected to said dry thermal unit and a second output connected to said wet thermal unit, said control for controlling and monitoring an efficiency status of said well structure using at least one of relay shaking, probe movement checking, probe feedback checking, disappearing equipment, water working system, air flow factoring, best verifiable logic, pulse cooling, AC energy sensor analysis, and cooling potential sensor analysis; and wherein said temperature monitor is at least one of said temperature sensors, and wherein said current monitor is said current sensor.

29. The thermal well as recited in claim 28 wherein and further comprising:

a dry heat temperature probe adjacent said dry thermal unit, connected to said controller, to measure dry heat; and a wet heat temperature probe adjacent said wet thermal unit, connected to said controller, to measure wet heat.

30. The system for controlling a food preparation as recited in claim 1 and wherein one of said plurality of electrically driven devices includes cooling system for at least one of a refrigerator, cooler, freezer, air conditioning device and the like, comprising:

an enclosure having an internal space for supporting items to be cooled;

a chiller coil in thermal communication with said internal space and having an inlet and an outlet for passing refrigerant, for providing cooling to said internal space;

a chiller coil temperature sensor attached adjacent to said chiller coil;

a refrigerant system having an air cooled condenser having an air path across said condenser, having an inlet and an outlet connected to said inlet of said chiller coil, a compressor having an inlet connected to said outlet of said chiller coil and an outlet connected to said inlet of said chiller coil, and carrying a refrigerant in said refrigerant system;

a condenser supply refrigerant temperature sensor in communication with refrigerant flowing toward said condenser;

a cooling potential probe located within said air path and downstream of said condenser; and a controller connected to said cooling potential probe, said chiller coil temperature sensor and said condenser supply refrigerant temperature sensor for monitoring and controlling said cooling system;

a current sensor associated with said electrically powered means for sensing at least a magnitude of electrical power consumed by said electrically powered means;

temperature sensors in thermal communication with said internal space; and a controller having a first plurality of inputs, each input associated with and connected to a single one of said temperature sensors, and at least a second input connected to said current sensor, at least one output connected to said refrigerant system, said controller for controlling and monitoring an efficiency status of said system using at least one of relay shaking, probe movement checking, probe feedback checking, disappearing equipment, water working system, air flow factoring, best verifiable logic, pulse cooling, AC energy sensor analysis, and cooling potential sensor analysis: and wherein said temperature monitor is at least one of said temperature sensors and wherein said current monitor is said current sensor.

* * * * *